US011087087B1

(12) United States Patent
Mayer

(10) Patent No.: US 11,087,087 B1
(45) Date of Patent: Aug. 10, 2021

(54) COMPARATIVE EXPRESSION PROCESSING

(71) Applicant: Robert Mayer, Brattleboro, VT (US)

(72) Inventor: Robert Mayer, Brattleboro, VT (US)

( * ) Notice: Subject to any disclaimer, the term of this patent is extended or adjusted under 35 U.S.C. 154(b) by 0 days.

(21) Appl. No.: 15/897,719

(22) Filed: Feb. 15, 2018

Related U.S. Application Data

(60) Provisional application No. 62/600,215, filed on Feb. 15, 2017.

(51) Int. Cl.
*G06F 40/30* (2020.01)
*G06N 5/02* (2006.01)
*G06K 9/62* (2006.01)
*G06F 40/211* (2020.01)
*G06F 40/289* (2020.01)

(52) U.S. Cl.
CPC ............ *G06F 40/30* (2020.01); *G06F 40/211* (2020.01); *G06F 40/289* (2020.01); *G06K 9/628* (2013.01); *G06N 5/022* (2013.01)

(58) Field of Classification Search
CPC ......... G06F 40/30; G06F 40/20; G06F 40/289
See application file for complete search history.

(56) References Cited

U.S. PATENT DOCUMENTS

| 8,275,803 | B2 * | 9/2012 | Brown | ................. | G06F 16/334 |
| | | | | | 707/802 |
| 8,332,394 | B2 * | 12/2012 | Fan | .......................... | G06N 5/02 |
| | | | | | 707/723 |
| 8,510,296 | B2 * | 8/2013 | Fan | .......................... | G09B 7/00 |
| | | | | | 707/728 |
| 8,510,327 | B2 * | 8/2013 | Boguraev | .............. | G16H 40/20 |
| | | | | | 707/769 |
| 8,600,986 | B2 * | 12/2013 | Fan | .......................... | G09B 7/00 |
| | | | | | 707/728 |
| 8,738,362 | B2 * | 5/2014 | Ferrucci | .............. | G06F 16/3329 |
| | | | | | 704/9 |
| 8,738,365 | B2 * | 5/2014 | Ferrucci | .............. | G06F 16/3329 |
| | | | | | 704/9 |
| 8,738,617 | B2 * | 5/2014 | Brown | ..................... | F16H 1/28 |
| | | | | | 707/731 |
| 8,768,925 | B2 * | 7/2014 | Brown | ............... | G06F 16/3344 |
| | | | | | 707/736 |
| 8,819,007 | B2 * | 8/2014 | Brown | ..................... | F16H 1/28 |
| | | | | | 707/731 |

(Continued)

FOREIGN PATENT DOCUMENTS

WO WO-2019043381 A1 * 3/2019 ............. G06F 40/20

OTHER PUBLICATIONS

Andrade, Heidi Goodrich. "Using rubrics to promote thinking and learning." Educational leadership 57.5 (2000): 13-19.

*Primary Examiner* — John Villecco

(57) ABSTRACT

Evidence-based computer knowledge acquisition, expression verification, and problem solving methods and systems are disclosed. Embodiments are described that include methods for automatically evaluating natural language expressions by processing an argument of an analysis of a natural language expression. Also included is the processing of one or more items of evidence associated with the argument, and determining a quality score for the argument and the one or more items of evidence. The arguments may be based on one or more criterion associated with the natural language expression.

23 Claims, 11 Drawing Sheets

---

TOPIC: Economy —— 704

QUESTION: "What policies led to economic recovery after the great depression in the U.S.?" —— 700

SYSTEM RESPONSE: INDETERMINATE }706

SYS SCORE: 0%    —— 710

| Rank/User | Criteria | Arguments | Evidence | Evidence Score | A/D |
|---|---|---|---|---|---|
| (1) User3 | [all] | Abandonment of Gold Standard | [reference1] | 90% | 120/1 |
| (2) User 41 | [all] | *Incomplete*: Increased money supply (credit) | [reference2] | 82% | 100/0 |
| (3) User17 | [all] | Devaluation of Currency | [reference3] | 73% | 40/200 |
| User 92 | [all] | The New Deal Programs | [reference4] | 78% | 10/150 |
| User 49 | [all] | *Disagree*: New Deal Programs =small effect | [reference5] | 90% | 50/145 |
| User 92 | [all] | WWII Spending | [reference6] | 68% | 10/150 |
| User 49 | [all] | *Disagree*: Mostly recovered before WWII | [reference7] | 70% | 50/145 |

714  716    718              720      722  726   }712

724

(56) References Cited

U.S. PATENT DOCUMENTS

| | | | | |
|---|---|---|---|---|
| 8,898,159 | B2* | 11/2014 | Brown | G06F 16/3329 707/730 |
| 8,972,440 | B2* | 3/2015 | Boguraev | G16H 15/00 707/769 |
| 8,990,234 | B1* | 3/2015 | Myslinski | G06N 20/00 707/758 |
| 9,002,773 | B2* | 4/2015 | Bagchi | G06F 40/134 706/52 |
| 9,037,580 | B2* | 5/2015 | Brown | G06F 16/3329 707/730 |
| 9,110,944 | B2* | 8/2015 | Brown | F16H 1/28 |
| 9,189,514 | B1* | 11/2015 | Myslinski | G06F 40/58 |
| 9,240,128 | B2* | 1/2016 | Bagchi | G09B 7/00 |
| 9,317,586 | B2* | 4/2016 | Chu-Carroll | G06F 16/24578 |
| 9,323,831 | B2* | 4/2016 | Chu-Carroll | G06F 16/24578 |
| 9,348,893 | B2* | 5/2016 | Brown | G06F 16/3329 |
| 9,495,481 | B2* | 11/2016 | Brown | G16H 10/60 |
| 9,507,854 | B2* | 11/2016 | Brown | F16H 1/28 |
| 9,519,686 | B2* | 12/2016 | Bufe, III | G06F 16/24578 |
| 9,600,601 | B2* | 3/2017 | Brown | G06F 16/31 |
| 9,633,006 | B2* | 4/2017 | Ryu | G06F 40/284 |
| 9,703,861 | B2* | 7/2017 | Brown | G06N 5/02 |
| 9,805,613 | B2* | 10/2017 | Bagchi | G09B 7/00 |
| 9,852,213 | B2* | 12/2017 | Brown | G06F 16/3329 |
| 9,864,818 | B2* | 1/2018 | Brown | G06N 5/027 |
| 9,965,509 | B2* | 5/2018 | Brown | G06F 16/2455 |
| 9,965,971 | B2* | 5/2018 | Bagchi | G09B 7/00 |
| 9,990,419 | B2* | 6/2018 | Brown | F16H 1/28 |
| 10,102,254 | B2* | 10/2018 | Bufe, III | G06F 16/24578 |
| 10,133,808 | B2* | 11/2018 | Brown | G06F 16/3329 |
| 10,169,424 | B2* | 1/2019 | Motte | G06F 17/30896 |
| 10,216,804 | B2* | 2/2019 | Chu-Carroll | G06F 16/24578 |
| 10,318,529 | B2* | 6/2019 | Brown | G06F 16/2455 |
| 10,331,663 | B2* | 6/2019 | Brown | G16H 40/20 |
| 10,387,576 | B2* | 8/2019 | Beller | G09B 19/00 |
| 10,515,073 | B2* | 12/2019 | Bagchi | G06F 3/048 |
| 10,592,502 | B2* | 3/2020 | Erpenbach | G06F 16/243 |
| 2009/0287678 | A1* | 11/2009 | Brown | G06F 16/334 |
| 2009/0292687 | A1* | 11/2009 | Fan | G06N 5/04 |
| 2011/0125734 | A1* | 5/2011 | Duboue | G09B 7/00 707/723 |
| 2012/0077178 | A1* | 3/2012 | Bagchi | G09B 7/00 434/362 |
| 2012/0078062 | A1* | 3/2012 | Bagchi | G16H 10/60 600/300 |
| 2012/0078636 | A1* | 3/2012 | Ferrucci | G06F 16/24564 704/270.1 |
| 2012/0078837 | A1* | 3/2012 | Bagchi | G06F 40/169 706/52 |
| 2012/0078888 | A1* | 3/2012 | Brown | G06F 16/24578 707/723 |
| 2012/0078889 | A1* | 3/2012 | Chu-Carroll | G06F 16/248 707/723 |
| 2012/0078890 | A1* | 3/2012 | Fan | G09B 7/00 707/723 |
| 2012/0078891 | A1* | 3/2012 | Brown | F16H 3/54 707/723 |
| 2012/0078955 | A1* | 3/2012 | Boguraev | G06F 16/334 707/769 |
| 2012/0084293 | A1* | 4/2012 | Brown | G06F 16/2455 707/741 |
| 2012/0158702 | A1* | 6/2012 | Kumar | G06F 16/215 707/723 |
| 2012/0301864 | A1* | 11/2012 | Bagchi | A61B 5/00 434/362 |
| 2012/0317046 | A1* | 12/2012 | Myslinski | G06Q 30/02 705/329 |
| 2012/0323906 | A1* | 12/2012 | Fan | G09B 7/00 707/723 |
| 2013/0006641 | A1* | 1/2013 | Brown | G06F 16/284 704/270.1 |
| 2013/0007033 | A1* | 1/2013 | Brown | G06N 5/02 707/764 |
| 2013/0007055 | A1* | 1/2013 | Brown | G06F 16/3344 707/769 |
| 2013/0013615 | A1* | 1/2013 | Brown | G06F 40/169 707/741 |
| 2013/0018652 | A1* | 1/2013 | Ferrucci | G06F 16/3329 704/9 |
| 2013/0018876 | A1* | 1/2013 | Chu-Carroll | G06F 16/3329 707/723 |
| 2013/0290370 | A1* | 10/2013 | Boguraev | G06F 16/3329 707/769 |
| 2014/0258286 | A1* | 9/2014 | Brown | G06F 16/3329 707/728 |
| 2014/0337329 | A1* | 11/2014 | Brown | F16H 57/035 707/723 |
| 2015/0026169 | A1* | 1/2015 | Brown | G06F 16/3344 707/723 |
| 2015/0248736 | A1* | 9/2015 | Myslinski | G06F 3/0488 705/319 |
| 2015/0293917 | A1* | 10/2015 | Bufe, III | G06F 16/24575 706/12 |
| 2015/0356172 | A1* | 12/2015 | Brown | F16H 3/54 707/728 |
| 2016/0005324 | A1* | 1/2016 | Bagchi | G09B 7/00 434/362 |
| 2016/0005325 | A1* | 1/2016 | Bagchi | G09B 7/00 434/362 |
| 2016/0147737 | A1* | 5/2016 | Ryu | G06F 40/211 704/9 |
| 2016/0162492 | A1* | 6/2016 | Bufe, III | G06F 16/2477 707/723 |
| 2016/0232165 | A1* | 8/2016 | Chu-Carroll | G06F 16/3329 |
| 2016/0239496 | A1* | 8/2016 | Motte | G06F 17/30864 |
| 2016/0246874 | A1* | 8/2016 | Brown | G06F 16/284 |
| 2016/0246875 | A1* | 8/2016 | Brown | G06F 16/284 |
| 2017/0053020 | A1* | 2/2017 | Brown | F16H 1/28 |
| 2017/0060990 | A1* | 3/2017 | Brown | G06F 16/532 |
| 2017/0154043 | A1* | 6/2017 | Brown | G16H 40/20 |
| 2017/0193088 | A1* | 7/2017 | Boguraev | G06F 40/284 |
| 2018/0025127 | A1* | 1/2018 | Bagchi | G06F 16/31 705/2 |
| 2018/0101601 | A1* | 4/2018 | Brown | G06F 16/3329 |
| 2018/0113867 | A1* | 4/2018 | Erpenbach | G06F 16/243 |
| 2018/0144066 | A1* | 5/2018 | Brown | G06F 16/90335 |
| 2018/0203922 | A1* | 7/2018 | Erpenbach | G06F 16/3334 |
| 2018/0246890 | A1* | 8/2018 | Brown | G06F 3/048 |
| 2018/0266531 | A1* | 9/2018 | Brown | G06N 20/00 |
| 2019/0163745 | A1* | 5/2019 | Beller | G06F 40/289 |
| 2019/0171646 | A1* | 6/2019 | Chu-Carroll | G06F 16/3329 |
| 2019/0243825 | A1* | 8/2019 | Erpenbach | G06F 40/10 |
| 2019/0266157 | A1* | 8/2019 | Brown | G06F 16/2455 |
| 2019/0318001 | A1* | 10/2019 | Beller | G06F 40/40 |
| 2020/0089677 | A1* | 3/2020 | Bagchi | G06F 16/24522 |
| 2020/0372423 | A1* | 11/2020 | Sabharwal | G06N 3/08 |
| 2020/0410050 | A1* | 12/2020 | Cason | G06N 20/00 |
| 2021/0057068 | A1* | 2/2021 | Dandala | G16H 10/60 |

* cited by examiner

TOPIC: Science —704

ALLEGED FACT: "...there existed a prehistoric 43-foot long boa..." —700

SYSTEM RESPONSE: CORRECT. About 60M years ago –Titanoboa —708

1) Fossil evidence of vertebrae were found in Columbia and compared to vertebrae of Anaconda to estimate a length of 13 meters [http://www.peer_reviewed_jnl.com/news/news.2009.80.html]
2) Other specimens found were up to 48 ft. long [http://www.non_peer_reviewed_chnl.com/show.do?show=14]

SYS SCORE: 85% —710

| Rank/User | Criteria | Argument | Evidence | Evidence Score | A/D |
|---|---|---|---|---|---|
| (1) User100 | Size Mod... | Vertebrae of Titanoboa were found in.... | [Head, Jason J., et al. ....] | 88% | 215/0 |
| (2) User2 | Size Mod... | There was one at Grand Central, NYC.... | [http://www.newspaper1...] | 22% | 158/3 |

FIG. 7A

TOPIC: Economy —704
QUESTION: "What policies led to economic recovery after the great depression in the U.S.?" —700

SYSTEM RESPONSE: INDETERMINATE —706

SYS SCORE: 0% —710

| Rank/User | Criteria | Arguments | Evidence | Evidence Score | A/D |
|---|---|---|---|---|---|
| (1) User3 | [all] | Abandonment of Gold Standard | [reference1] | 90% | 120/1 |
| (2) User 41 | [all] | *Incomplete*: Increased money supply (credit) | [reference2] | 82% | 100/0 |
| (3) User17 | [all] | Devaluation of Currency | [reference3] | 73% | 40/200 |
| User 92 | [all] | The New Deal Programs | [reference4] | 78% | 10/150 |
| User 49 | [all] | *Disagree*: New Deal Programs =small effect | [reference5] | 90% | 50/145 |
| User 92 | [all] | WWII Spending | [reference6] | 68% | 10/150 |
| User 49 | [all] | *Disagree*: Mostly recovered before WWII | [reference7] | 70% | 50/145 |

COMPARATIVE EXPRESSION PROCESSING

CROSS-REFERENCE TO RELATED APPLICATIONS

The present application claims priority benefit from U.S. provisional patent application No. 62/600,215 filed Feb. 15, 2017 and entitled "Comparative Expression Processing," the disclosure of which is incorporated by reference herein in its entirety.

BACKGROUND

Automated learning, reasoning, and problem solving are areas of intense research in Artificial Intelligence (AI) engineering. Applications of AI for knowledge acquisition and delivery include Expert System, Question Answering (QA), Machine Learning (ML), Knowledge Discovery (KD) and Information Extraction (IE). Expert systems, for example, use a knowledge-base that includes facts and heuristics, or rules, for performing problem solving analyses. Multiple sources may be used to develop a knowledge-base for machine learning, including electronic and physical resources such as encyclopedias, databases, reference texts, journal articles, social media, blogs, and other sources. Search engines on computer resources can facilitate information discovery and retrieval, however, assessment of the quality and relevance of the retrieved material is often left for a human to evaluate. The information retrieved may be accurate, valid, and consistent when a subject matter is at a mature stage. Where subject matter is at an immature stage, or is subject to frequent changes due to the introduction of new evidence, a knowledge-base may contain erroneous information. In addition, as a consequence of the relative ease of information exchange on the Internet, unsubstantiated and incorrect information may be propagated into knowledge-bases that assimilate such information without first evaluating the veracity of such evidence. Applying inadequate information substantiation protocols may allow opinion and erroneous information to be perceived and perpetuated as fact and stored into knowledge bases that may lead to incorrect analyses and conclusions by AI systems.

Experts and researchers manually build upon their knowledge in a subject matter and verify veracity using documented work-product published in reputable reference sources. Reputable research results are published in sources that are typically peer-reviewed and research results are presented in a manner that may be verified by others. Articles are written with citations to relevant earlier or contemporaneous references, which promotes substantiation (e.g verification and corroboration) of results and adds credibility to an author's arguments.

Research conducted manually may be limited by the specific publications, and data to which researchers and experts are exposed. The evidence accessed may be a small subset of the available evidence on a particular subject or topic of interest. For example, a typical search for evidence using an Internet search engine may produce far more links to relevant writings than are able to be manually read by an individual. A set of evidence, while relevant to evaluation of a topic, may not be considered for multiple reasons including unavailability of such evidence, overabundance of relevant evidence with insufficient time to read the works, and advocacy of a particular viewpoint. Evidence accessed by a person may also lack an objective measure of veracity, which may impact the quality of analyses resulting from using the evidence. A knowledge-base relying on the resulting collection of analyses and evidence may be erroneous and unreliable.

SUMMARY

This summary is provided to introduce a selection of concepts in a simplified form that are further described below in the Detailed Description. This summary is not intended to identify key features or essential features of the claimed subject matter, nor is it intended to be used as an aid in determining the scope of the claimed subject matter.

Evidence-based computer knowledge acquisition, expression verification, and problem solving methods and systems are disclosed. Embodiments are described that include methods for automatically evaluating natural language expressions by processing an argument of an analysis of a first natural language expression. The analysis includes an argument associated with the first natural language expression, an argument associated with an issue described by the first natural language expression, or an argument associated with a solution to a problem described by the first natural language expression. Also included is the processing of one or more items of evidence associated with the argument, and determining a unified quality score. The argument obtained is associated with one or more obtained items of evidence and a source disclosure for each item of evidence is determined. Entities may be associated with arguments and the items of evidence using assigned entity identifiers.

Various embodiments include determining an argument quality score, and an evidence quality score for each item of evidence based at least on one or more rules to determine quality of the argument, and quality of each item of evidence, respectively. At least one rule may be performed on the argument quality score, and the evidence quality score for items of evidence associated with the argument to determine a unified quality score.

Various embodiments include associating at least one criterion with a first natural language expression, and generating a criterion weight for each criterion based at least on one or more rules that quantifies a relationship between each criterion and the first natural language expression. The method also includes associating the respective criterion weight with each of the corresponding criterion, and associating an argument of an analysis of a first natural language expression, and at least one item of evidence with at least one criterion. Also included is a step of determining an argument quality score for each argument associated with the respective criterion, based at least on at least one rule to determine quality of the argument. Also included is determining an evidence quality score for each of at least one item of evidence associated with the respective argument and the criterion, based at least on at least one rule to determine quality of the at least one item of evidence. In various embodiments, selected arguments and the respective items of evidence are aggregated.

Some embodiments include performing at least one subjectivity analysis operation on a natural language expression to determine one or more objective expressions, and substituting the natural language expression by the objective expression according to at least one rule.

Additional features, advantages, and embodiments of the disclosed subject matter may be set forth or apparent from consideration of the following detailed description, drawings, and claims. Moreover, it is to be understood that both the foregoing summary and the following detailed description are exemplary and are intended to provide further explanation without limiting the scope of the claims.

BRIEF DESCRIPTION OF THE DRAWINGS

The accompanying drawings, which are included to provide a further understanding of the disclosed subject matter, are incorporated in and constitute a part of this specification. The drawings also illustrate embodiments of the disclosed subject matter and together with the detailed description serve to explain the principles of embodiments of the disclosed subject matter. No attempt is made to show structural details in more precision than may be necessary for understanding of the disclosed subject matter and various ways in which it may be practiced.

FIG. 7A shows an example representation of analyses and discussion of an alleged factual expression according to some embodiments of the disclosed subject matter.

FIG. 7B shows an example representation of analyses and discussion of an issue according to some embodiments of the disclosed subject matter.

DETAILED DESCRIPTION

The present disclosure describes technologies and methods for implementing evidence-based expression processing for computer knowledge acquisition, expression verification, and problem solving using at least one computing system. Some embodiments herein described may be applied to improve computing system functionality to efficiently conduct objective, evidence-based analyses and resolution of problems.

In the present disclosure, an "engine" is any software, hardware, firmware, or any combination of software, hardware and firmware that can perform one or multiple computer operations to enable a particular function. Computer operations may implement a set of rules and data handling tasks.

In the present disclosure, an "entity", "user", "entities", and "users" are used interchangeably and are intended to represent one or more of the following: an automated apparatus, a computing system, a computing system on a network of computing systems, an automated process, a computer agent, a computer program, at least one computer operation, an application specific machine, or a human.

In the present disclosure, "memory" and "memory device" are used interchangeably and are intended to represent any device capable of storing and retrieving information in digital or analog formats.

In the present disclosure, "subjectivity analysis" is used to classify natural language expressions into subjective, objective, or having a combination of subjective and objective expressions. "Subjective expressions" identify opinions that declare an author's belief, for example, and may exhibit a polarity (positive or negative). "Objective expressions" are fact-based, and may be presented in the form of phrases, questions, issues, problems to be solved, or expressions to be fact-checked. An opinion without objective basis is entirely subjective. Subjectivity analysis may be used to remove entirely subjective expressions from further fact-based evaluation. A search for analyses and evidence without first considering the differing approaches to handling objective versus purely subjective elements may result in misleading, incomplete, or erroneous results.

In the present disclosure, "criterion" is used to indicate any number of sub-problems, sub-issues, characteristics, or parameters of the expression to be evaluated. They are individually referred to as a criterion, $C_n$, where n is an integer. A plurality of criterion is collectively referred to as "criteria". Identifying the set of relevant criteria may be critical to the synthesis of an accurate and comprehensive answer to a presented problem. The criterion may be directly or tangentially related to a problem or issue. Any number of criteria may define a complete and accurate solution to a problem and each criterion may be individually analyzed.

A) General Overview

Figure 1:
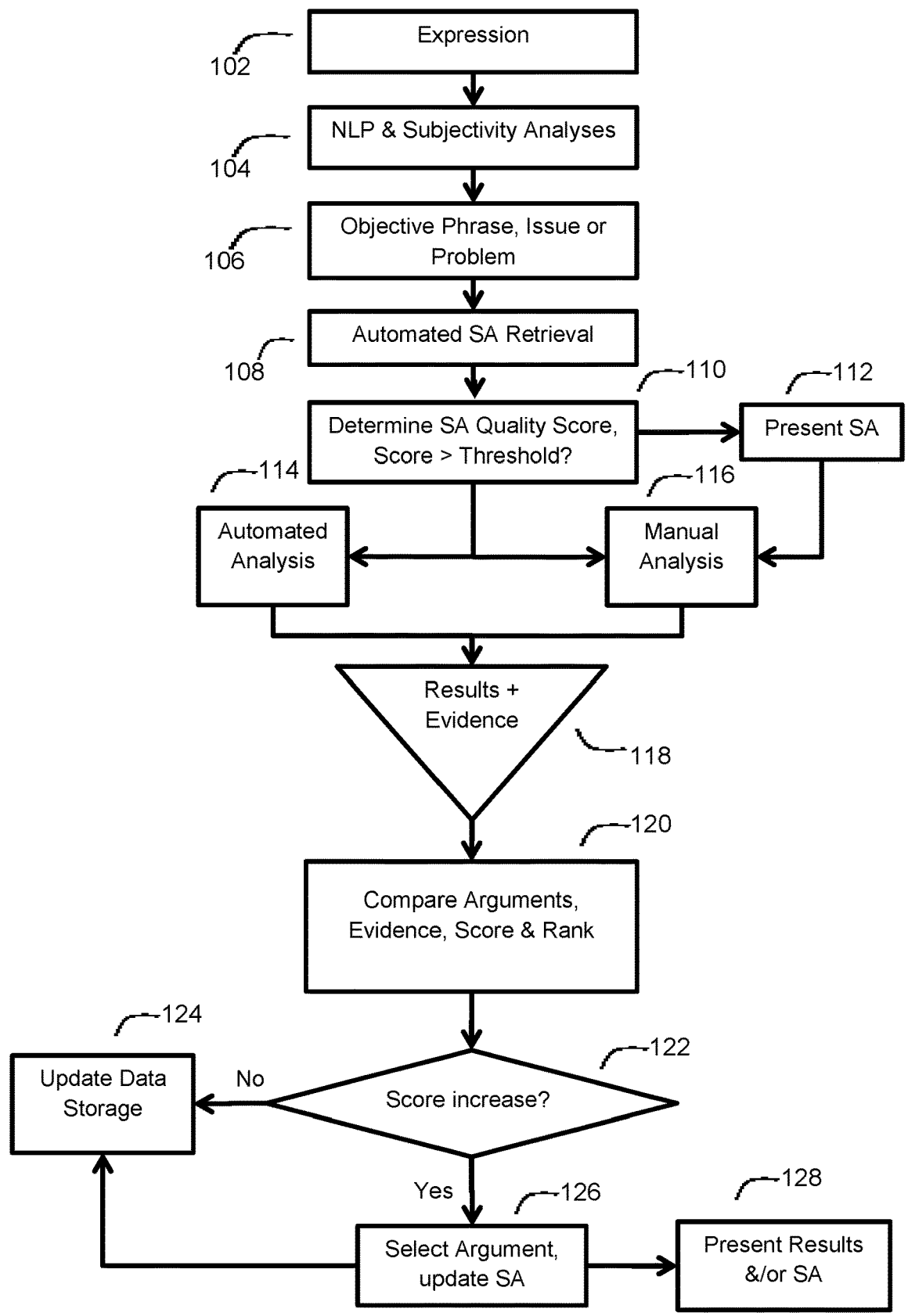
FIG. 1 shows a block diagram of a computer knowledge acquisition, expression verification, and problem solving method according to some embodiments of the disclosed subject matter.

The block diagram of FIG. 1 shows operations to process natural language expressions for knowledge acquisition, problem solving and expression verification.

At least one natural language expression to be analyzed by a computing system may be input into the system or it may be retrieved from non-transitory memory box 102. A natural language expression may be any number of phrases, sentences, paragraphs, questions, queries, statements, and exclamations, or combinations thereof. Expressions may be text-based or may be in a multimedia format that is transformed into a text format using speech or image recognition operations and Natural Language Processing (NLP) operations box 104, for example. NLP box 104 applies linguistic, statistical and computer learning techniques to discern and annotate features such as terminology, entities, facts, and concepts in information sources, to extract them, and to discover patterns, relationships, grammar, and meaning. In some embodiments, NLP box 104 may be applied using syntactic rules, semantic rules, and other contextual clues applied to one or more expressions, for example.

In some embodiments, subjectivity analysis box 104 may be performed that distinguishes objective from subjective expressions and is used to remove purely subjective expressions from further fact-based evaluation. Subjective expressions, such as opinions that are incapable of being substantiated, may be presented to users without further factual analysis. In some embodiments, objective expressions in the form of phrases, questions, issues, problems to be solved, or expressions to be fact-checked box 106 are subject to further analyses. NLP and subjectivity analysis box 104 may be used to reformulate an expression into an expression structure that assists further analysis. For example, a statement may be reformulated as a question, reformulated into an alternate grammatical style, or converted from one language into another. In some embodiments, an NLP analysis box 104 also reformulates expression structure so that expressions to be analyzed are compared with expressions previously analyzed. Matching similar expressions may facilitate search of previously stored analyses using a similarity metric. Similar questions may have equivalent answers, for example.

Answers to questions, issues and problems are comprised of arguments and supporting evidence. The answers may be obtained by retrieving records of arguments of analyses from non-transitory memory, by performing automated analyses using inference, for example, to generate arguments, and by generating arguments of analyses manually by humans, or a combination of these methods. The analysis may be of a type that includes an argument associated with the natural language expression, an argument associated with an issue described by the natural language expression, and an argument associated with a solution to a problem described by the natural language expression. In the present disclosure, arguments may include explanations of subject matter.

In some embodiments, records of previously ascertained responses (e.g. answers) are retained in connected non-transitory memory. Answer quality may be scored, and the score may be stored and linked with the answer, for example in a database. The answer with the greatest quality scores may be classified as the Supported Answer (SA), for example. Automated SA retrieval 108 may be performed by initiating computer operations to search one or more data archives for records that provide an answer to a question, issue, or problem to be solved. Throughput and efficiency may be enhanced using taxonomies and ontologies associated with relevant knowledge-bases. Equivalent queries may take multiple syntactic and semantic forms resulting in multiple corresponding answers. When multiple answers (or responses) are found, a metric may determine the answer that most closely corresponds with the question (or query) presented. The SA and the supporting evidence may be retrieved box 108 and presented to users box 112. In some embodiments, the presentation of the SA to users box 112 is conditional upon a quality score of the SA exceeding a threshold score box 110, for example. A quality score may be below the threshold value when an SA remains in contention because the expression has not been adequately analyzed, or supporting evidence does not substantiate an answer, for example. The SA may be reevaluated and updated at any time, based upon automated analyses box 114 and manual analyses box 116. The cause for an SA reevaluation may be triggered by an event such as an SA quality score not meeting a threshold value box 110, a lapse of an interval of time, receipt of new supportive or contradictory information, or generation and receipt of a manual analysis box 116 or an automated analysis box 114.

In some embodiments, an automated expression analysis box 114 is performed by computing system operations that include synthesis of answers and retrieval of supporting evidence. Answers may contain arguments and any number of items of evidence that support the arguments. An argument may discuss a criterion such as a sub-issue, sub-problem, characteristic, or parameter. Iterative graph and tree algorithms may be used for answer determination, and answer similarity metrics may assist answer ranking and selection. Automated theorem proving algorithms may assist with problem solving.

In various embodiments, human users may manually perform analyses of expressions box 116 and disclose supporting evidence from physical and electronic sources. Some embodiments include problem solving using a combination of automated box 114 and manual box 116 analyses. For example, a portion of presented arguments may be performed automatically using computer algorithms implemented by computer operations, while human curators answer the same or different portions of the presented problem. The automated analyses box 114 and manual analyses box 116 may be scored and the highest scoring arguments may be combined and presented as a complete solution to a problem or issue. In another example of combining automatic and manual evaluation, a presented argument may be determined automatically using computer operations, while substantiating evidence is supplied by human curators.

Expression analysis includes obtaining supporting evidence. Supporting evidence may be collected manually by users, automatically by computer operations, or by a combination of automated and manual evidence collection. For example, a portion of evidence supporting a presented argument may be obtained by computer, while human curators obtain additional portions of evidence. The automated and manually collected evidence may be pooled. Example items of evidence include a peer-reviewed publication, a non-peer-reviewed publication, a collection of empirical data, a model, a mathematical proof, a logical proof, a learned treatise, an authenticated document, an audiovisual recording, a multimedia item, an official document, a business document, an historical document, a reference source, and a publication citation.

In various embodiments, the manual and automated analyses and items of evidence, including evidence source disclosures (e.g. reference citations), are collected, and may be aggregated, stored, and cataloged box 118. The veracity of proposed answers, including arguments, and evidence, may be evaluated and compared using automated (e.g. rule-based) and/or manual scoring metrics box 120. Argument and answer quality may be determined, for example, from consensus, statistical evaluation, analyses using first or higher order logic, theorem proving, and proof verification rules. Metrics for determining argument and answer quality scores include, for example, the degree to which an argument or answer is logical, accurate, complete, and supported by relevant evidence. Metrics for evidence quality scoring include, for example, source reputation and scholarly impact and third-party citation assessment scores. The metrics may be applied using a rule or set of rules that assigns numeric values indicating quality. Analyses that are well supported by logical reasoning and high quality relevant evidence, receive high scores and may be selected during comparison operations box 120. Rules may be written into computer code and used for automatic scoring.

In some embodiments, an argument quality score and supporting evidence quality scores may be unified into a single "unified quality score" using processes that follow one or more rules. For example, an averaging function may normalize a plurality of evidence quality scores and thereafter include the argument quality score to compute a unified quality score. In various embodiments, an answer containing multiple sub-arguments or arguments addressing multiple criteria may be scored separately for each argument, and those scores may be unified using a rule or set of rules. An "answer quality score" for answers encompassing multiple arguments may be determined by performing operations to combine multiple unified quality scores, for example. In various embodiments, answer quality scores may be determined by performing operations to combine multiple argument quality scores and evidence quality scores. Unified quality scores and answer quality scores may be iteratively updated as additional scored arguments and scored evidence modify the arguments and answers. In some embodiments, the quality of an answer, argument, and the supporting evidence may be separately scored by various independent entities. For example, an argument may be scored by a human analyst who follows a rubric or set of rules, while supporting evidence may be scored by computer analyses according to one or more rules in the form of algorithms. Alternatively, one software agent on a computer network may provide an argument score, while a second software agent scores the supporting evidence. The applied rules may be general or domain specific.

An increasingly accurate, complete, and supported solution to a particular problem may be synthesized as analyses are aggregated, and quality scores assessed. Arguments with supporting evidence may be compared and ranked box 120, and arguments and evidence with the greatest quality scores may be selected to update an existing SA. The quality score of the SA may be recalculated and updated to reflect the improved answer score. In some embodiments, if an answer quality score of an answer under assessment exceeds the score of an existing SA box 122, the existing SA may be replaced by the answer under assessment and the quality score of the resulting newly assigned SA may be updated box 126. The SA, in addition to other answers and supporting evidence, may be presented to entities box 128, and the SA, evidence, and evidence citations may be stored box 124. In some embodiments, lower scoring arguments and answers and their associated supporting evidence may also be stored box 124. Answers and arguments may be scored, ranked, and searched based on the relative ranking. In various embodiments, the storing of an SA, and ranking of answers, arguments, and supporting evidence may be used to establish a hierarchy that can reduce the complexity of data searches. Database size may also be reduced as lower scoring arguments and evidence are identified, and archived or discarded. These operations also enhance system functionality by reducing computational complexity because the collection of data from which subsequent analyses and evidence are obtained may be pruned based on answer and evidence quality scores. The subsequent quality assessment of retrieved data and the ability to reduce the amount of data stored and/or evaluated by the AI system, thereby improves system performance. The embodiments described herein provide an unconventional technical solution to the problem of building an efficient, reliable, accurate, verifiable, and precise knowledge-base from which ML and KD systems may extract data.

In various embodiments, the argument and its associated evidence may be a single iteration of a processing operation, or may represent a single element in a processing pipeline, for example.

FIG. 1 illustrates a general method for knowledge acquisition, problem solving and expression verification. The following paragraphs describe embodiments of the method illustrated in FIG. 1 for resolving problems and issues, and performing assessment of alleged factual information.

i) Problem or Issue Resolution

In various embodiments of the method of FIG. 1, an expression may be presented for a problem or issue to be resolved box 102. Initially, NLP box 104 may be performed on the expression to determine structure and meaning. In some embodiments, subjectivity analyses box 104 may be performed to extract objective expressions box 106 from the original expression 102. NLP analysis operations box 104 may analyze and reformulate any extracted objective expressions box 106 for the problem or issue to be resolved into queries that are more easily comprehended by a computer or by humans. If more than one objective expression is determined from the initial query, one or more rules may determine a selection and sequence for performing the analyses on the objective expressions. Alternatively, an alternate entity (e.g. a human or networked computing system) may determine the selection and order of performing the analyses. For example, a rule may instruct a computing system to present a listing of the objective expressions from which one or more expressions to analyze, in a specified sequence, may be selected. An initial search for an SA from storage may provide an answer to the problem box 108, for example, and a quality score for the answer may be determined box 110 and presented box 112. A score below a threshold value may automatically trigger an automated analysis by the analyzing computing system box 114 and/or be presented for manual (e.g. curator) analysis box 116. In several embodiments, complex issues or problems to be solved may be subject to extensive dialogue by entities, and several criteria may be specified and analyzed resulting in a number of supporting and refuting arguments being presented. Arguments to a problem or issue, resolved by entities may be aggregated box 118. Evidence may be collected box 118 and the quality of the arguments and evidence may be scored by computer operations in accordance with programmed rules box 120. In some embodiments, human users may score the quality of arguments and evidence. The scores may be compared and ranked box 120, and arguments and supporting evidence resulting in the greatest unified quality scores may indicate the most viable solutions, for example. The values of the highest scoring arguments and evidence may be compared with the unified quality scores of the corresponding arguments and evidence in the SA boxes 120, 122. In various embodiments, argument quality scores and evidence quality scores of answers may be used to individually assess quality of arguments and evidence in an SA. Arguments and evidence that yield higher quality scores than those within the SA may be selected to append to or replace those arguments and evidence in the SA box 126. The resulting answers, arguments and supporting evidence, may be stored box 124 for future access. The unified quality scores of the arguments comprising the resulting SA may be updated, and the SA may be presented to entities box 128. An answer quality score may be determined by a set of rules that combines (e.g. averages) the aggregate of quality scores, such as unified quality scores, for the arguments that comprise the answer. Lower scoring arguments may also be retained and stored box 124 to facilitate machine learning (e.g. Deep Learning) or otherwise provide information to users.

ii) Fact Assessment

In various embodiments of the method of FIG. 1, the task may be to assess the veracity of an expression box 102 that is alleged to be "fact". NLP box 104 and subjectivity operations box 104 may ascertain meaning and verify that the type of expression is objective box 106, and suitable for factual evaluation. An initial computer search may retrieve an SA from storage box 108, and determine the quality score of the SA box 110. If the score of the SA is higher than a threshold value box 110, the SA may be presented box 112, and the truth or falsity of the alleged "fact" may be ascertained by comparing it with the SA, and present the veracity result presented box 112. Also, a number of answers formulated by the computing system box 114 and manually by human users/curators box 116 may be determined, aggregated, and examined box 118. Scoring algorithms may assess the veracity of the arguments box 120, provided by automated box 114 and manual box 116 analyses, and arguments may be selected, at least in part, by comparing and sequencing (e.g. ranking) arguments based on the scores box 120. As an example, an alleged "fact" supported by a corroborating comprehensive paper from a peer-reviewed journal may receive high analysis and evidence quality scores, indicating strong factual support. An evaluated expression may be determined to be "correct", "incorrect", or "unresolved", for example, and assigned a status indicator reflecting such a state. The indicator, the argument, and evidence may be presented to entities box 128. The expression and an indicator of its status may be relationally linked, for example, and stored in a data archive (e.g. a database) box 124 for future access. The quality scores determined for arguments may be ranked, and one or more arguments that exceed the corresponding argument scores of the SA may be selected box 126, stored in an updated SA for future access box 124, and communicated to entities box 128. Other arguments may also be stored box 124, and an answer quality score may be determined by applying one or more rules, such as numerical averaging.

B) Expression Handling

Figure 2:
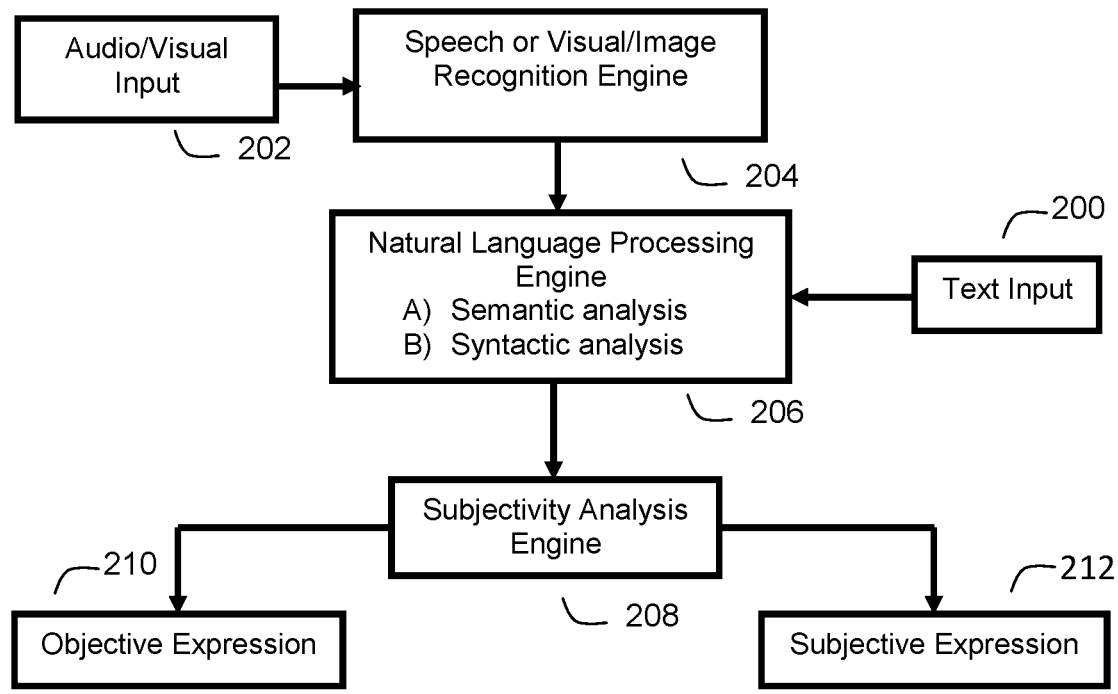
FIG. 2 shows a block diagram for Natural Language Processing and subjectivity analysis according to some embodiments of the disclosed subject matter.

FIG. 2 illustrates elements of NLP and subjectivity analysis according to various embodiments of the disclosed subject matter. Expression input may be in textual, audio, or visual/image formats. Text may be input box 200 from a device (e.g. a keyboard) or accessed from a computer file. Audio or visual/image expressions box 202 may be converted into text using operations performed by speech and image recognition engines box 204. In some embodiments audio-to-text conversion algorithms such as the Hidden Markov Model may be used. Visual or image formats may be converted to text by optical character recognition (OCR) operations, for example, to be further processed by operations performed by an NLP engine box 206. Examples of OCR capture and decode methods include matrix matching (also called pattern matching), feature extraction, and dynamic character recognition. Other visual/image scene recognition and interpretation algorithms may also be used and converted to text format.

In other embodiments, Closed-Captioning (CC) technology may be used to capture and transform audiovisual images into text. CC technology manually or electronically converts spoken phrases into text in real-time or from previously recorded multimedia sources. Manually this may be accomplished by stenocaptioners and electronically by speech recognition and machine learning computer code to transcribe speech into text and broadcast the transmitted text to CC-ready equipment (including audiovisual consumer electronics) or onto a network. Text may be broadcast in real-time or stored on networked computer servers for later access by network-enabled devices on demand.

In various embodiments, natural language characters may form a natural language word or short phrase (e.g., Chinese characters) or they may be combined with other characters to produce words and phrases (e.g. Latin-based languages). Recognized characters may be processed by an NLP engine box 206, where meaningful words may be formed using a lexicon, for example. Operations performed by an NLP engine box 206 may also form sentences and phrases using syntactic rules, and ascertain intended meanings using semantics and contextual clues. Expressions may also be transcribed from one language into another.

Semantic and syntactic analyses performed by an NLP engine, box 206, enable automated dissection of natural language sentences into component grammatical and contextual parts. Linguistic units include characters, words, lemmas, stems, N-grams, and phrases. An NLP engine box 206, for example, may implement phrase-structure rules to parse phrases and sentences (e.g. to describe noun, verb, or prepositional phrases) and to describe lexical categories (e.g. nouns, verbs, adjectives, adverbs). In various embodiments, computer operations may be incorporated into an NLP engine box 206 for grammatical parsing, discourse analysis, topic segmentation, and word sense disambiguation. Analyses may be implemented using unsupervised, supervised or semi-supervised NLP engines box 206.

In some embodiments, the expressions resulting from an NLP analysis may be processed by a subjectivity analysis engine box 208 that may determine whether the expression under analysis is objective box 210 (e.g. alleged factual statements), entirely subjective box 212 (e.g. opinions without objective basis), or has both objective and subjective elements within the expression. Sentences that express opinions contain subjective words, or a combination of subjective and objective words. Since multiple expressions may be required for subjectivity recognition, a subjectivity analysis may be performed on one or more sentences, phrases, paragraphs, or an entire document. Additional detail regarding subjectivity analysis is discussed in the following section.

C) Subjectivity Analysis Detail

A subjectivity analysis may be performed to classify expressions as subjective and objective, FIG. 2 box 208. Opinions are subjective expressions that declare an author's belief and may exhibit polarity (i.e. they may express positive or negative beliefs). Opinions, without objective basis, contain exclusively subjective words, and expressions. Various embodiments may use a variety of techniques for detecting subjective expressions, including keyword detection, lexical affinity detection, statistical processes such as Bayesian inference and Support Vector Machines (SVM), and concept-based approaches using semantic knowledgebases. These example techniques may be used individually or in combination to obtain comprehensive and efficient differentiation of subjective expressions box 212 from objective expressions box 210. In various embodiments, non-textual methods of opinion detection may include aural or image feature analyses, including facial, gesture, or vocal expression detection.

Figure 3A:
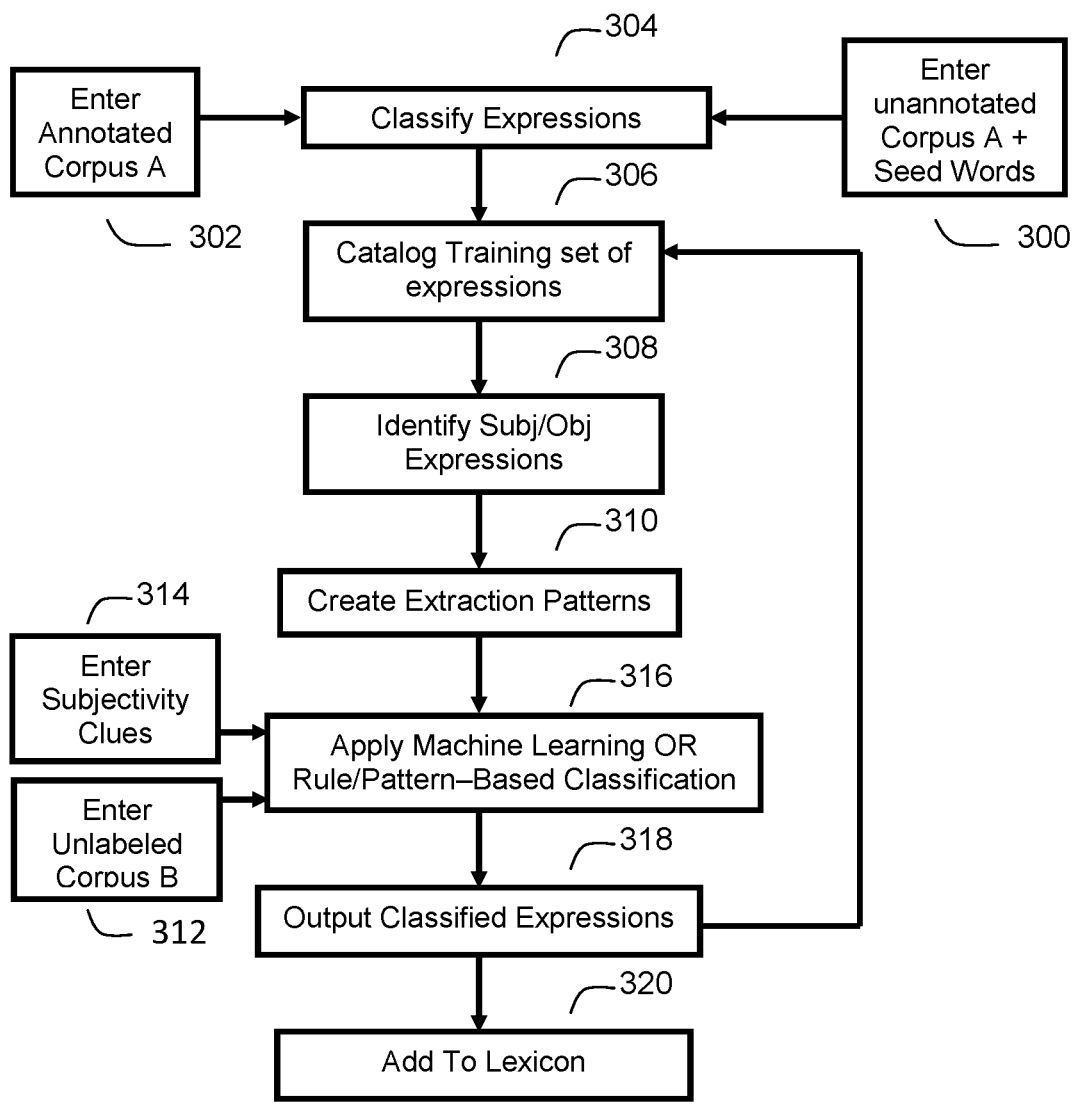
FIG. 3A shows a block diagram of elements in an automated expression classification method according to some embodiments of the disclosed subject matter.
Figure 3B:
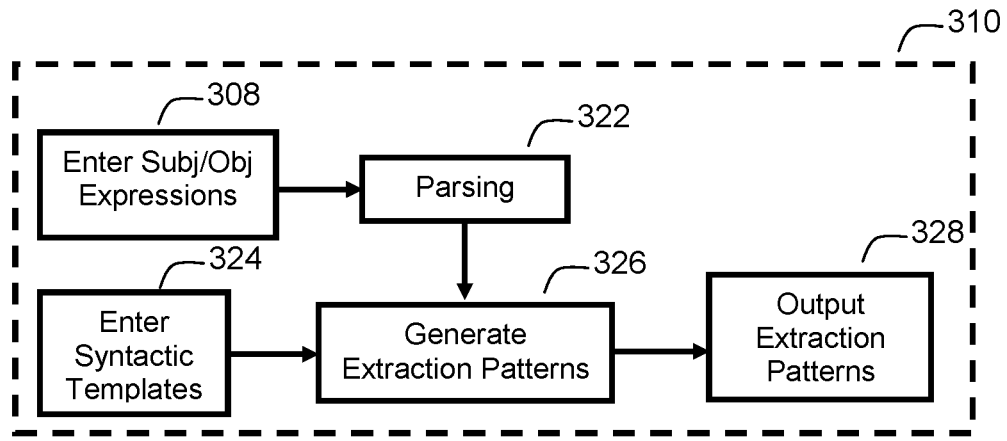
FIG. 3B shows a block diagram of an extraction pattern generation method associated with some embodiments of the disclosed subject matter.

In some embodiments, a method for detecting and classifying expressions to detect opinions, for example, may use a catalog of subjective keywords and N-grams as clues to indicate subjective expressions box 212 and to separate those expressions from objective expressions box 210 that lack subjective clues. An embodiment of an expression classification method is shown in FIG. 3A and FIG. 3B. FIG. 3A illustrates a block diagram of a semi-supervised self-training method for classifying subjective and objective expressions. Various embodiments of the method use an initial set of manually derived seed words and an unannotated corpus, box 300, and other embodiments use an annotated corpus with or without the inclusion of seed words, box 302. Seed words are words that indicate an expression type (e.g. subjective) and facilitate selection of other expressions that are likely to be of the same type.

Expressions extracted from an annotated corpus may initially be classified as belonging to a particular type box 304, such as subjective, and may be cataloged and used as an initial small training set, box 306, of known words and expressions of that particular type. Other expressions may be similarly identified as subjective and objective box 308. Computer operations may be performed to create extraction patterns box 310 by an extraction pattern generation engine using the training set. Extraction patterns act as templates for automated identification of subjective and objective expressions, and facilitate building an archive of classified expressions. In various embodiments, the generated extraction patterns box 310, at least one unlabeled corpus box 312, and additional subjectivity clues box 314, may be processed by machine learning (e.g. Naïve-Bayes) or rule/pattern-based classification operations, box 316, to further increase the training set of subjective and objective expressions, box 318, and expand a lexicon, box 320. Subjectivity clues, box 314, are manually or automatically determined words or N-grams such as nouns and adjectives.

FIG. 3B illustrates a process of generating extraction patterns box 310 in some embodiments. A group of expressions previously identified as subjective or objective box 308 are input, and a parser, for example, decomposes each expression into grammatical parts such as noun phrase, verb phrase, and a prepositional phrase box 322. Clauses are separated, and the subject, direct object, and indirect object may be identified, for example. A group of syntactic templates, box 324, may be applied. One example of a syntactic template is <subject> passive-verb. In the case of subjective expressions, a polarity (positive or negative) may also be identified. The clause structure of an expression under examination may be compared to the template by extraction pattern generation operations box 326 and where a match exists, an extraction pattern is generated box 328 by replacing the instance of the grammatical object in the syntactic template. For example, in the case of a template <subject> passive-verb, a search of a corpus may identify the passive verb "was satiated", in a sentence where there is also a subject. The extraction pattern produced is "<subject> was satiated". Other parsed expressions in a corpus may be matched to templates, resulting in additional extraction patterns. In this manner, a group of extraction patterns may be built up and stored. Repeated training with additional corpora may build up an increasingly accurate and enlarged set of classified expressions and lexicons. Accuracy may be determined by classification recall and precision metrics applied to annotated texts.

The embodiments described with reference to FIG. 3A and FIG. 3B exemplify a semi-supervised self-training set of processes for classifying expressions exhibiting minimal manual intervention. Other embodiments may include manual determination of expression classification (i.e. supervised) and unsupervised expression classification schemes.

In some embodiments, automated subjectivity analysis may be performed by the AI system and one or more objective expressions may be determined. Reducing an expression into one or more objective expressions permits the system to analyze the objective parts of the expression separately. For example, in the expression "what is the optimal size and shape of widget ABC for XYZ purposes and what color is the prettiest?", the system can analyze factors affecting the "optimal size" separately from analyzing the "optimal shape", and then combine the analyses to consider the "size and shape" part of the question. The purely subjective part of the inquiry regarding selection of "the prettiest" color may prompt a system response of "beauty is in the eye of the beholder" or "the most popular color is blue" or something to that effect, for example. The subjectivity analysis imparts added functionality to the AI system during expression analysis. A search for analyses and evidence addressing optimal size, shape, and "prettiest color" without first considering the differing approaches to handling objective versus purely subjective elements, may result in misleading, incomplete, or erroneous results.

D) Content Analyses

An objective phrase, problem, or issue may be analyzed automatically by computer operations or manually by humans for the purpose of fact verification, problem solving, issue resolution, and knowledge acquisition. The analyses may be individually or collectively performed by a group of entities.

Analyses may be performed with the assistance of specific computing architectures designed to handle NLP, knowledge management, and problem solving tasks. Example architectures include Question-Answer Systems, Expert Systems, Machine Learning, and Information Extraction (IE) systems. A variety of architectures may be used individually or in combination.

In various embodiments, the process of problem solving involves presenting arguments supported by cited and/or retrieved evidence. The purpose of evidence and source disclosure is to permit verification of premises, explanations, and conclusions presented by an argument, and to promote analyses and dialog based on verifiable evidence. The quality of cited evidence may be analyzed and scored by entities, either manually by humans or automatically by computer operations based on a set of metrics. The metrics may include, for example, scholarly impact of cited evidence, relevance of the cited evidence, publication reputation, and other attributes. The metrics may be embodied by a rule or set of rules and represented numerically.

Figure 4A:
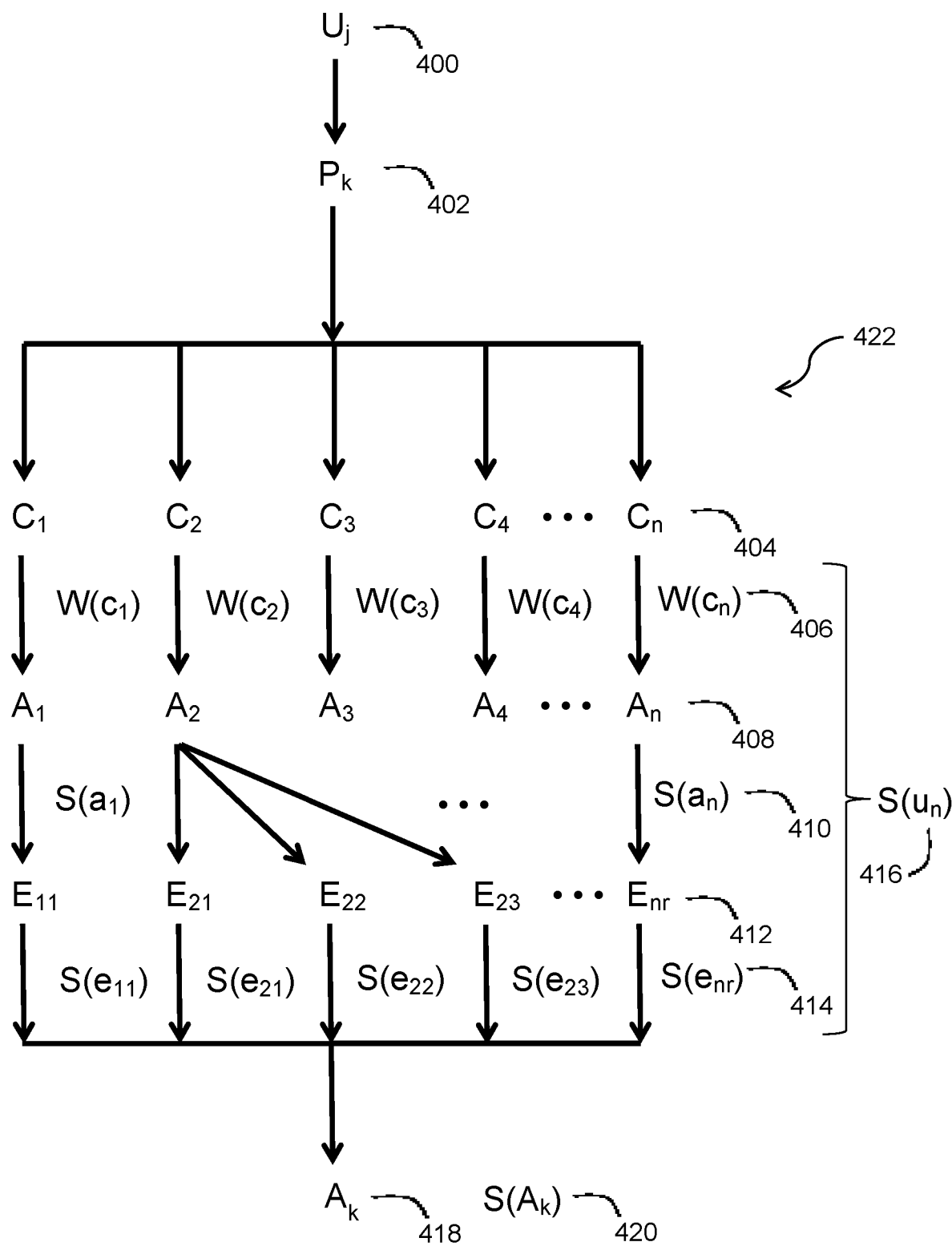
FIG. 4A shows elements for an expression analysis according to some embodiments of the disclosed subject matter.

FIG. 4A illustrates a flow diagram of an expression analysis process 422 for various embodiments. A particular user in a group of users, U, is represented by $U_j$ 400, where j is an integer. Any user 400 may present a particular expression to be evaluated, $P_k$ 402, where k is an integer, in a group of expressions, P. Alternatively, a user may select an expression 402 to analyze from a choice of already presented expressions. The expression 402 may be in the form of a question, a statement, or a query regarding an issue or problem to be solved. An expression 402 to be evaluated may be a factual type question (e.g. "what is the length of an American football field?"), a problem to be solved (e.g. "How can air turbulence from an automobile windshield wiper be reduced?"), or a statement to be checked for veracity (e.g. "The job loss this year has been the greatest since the great depression"). The expression 402 to be evaluated may have multiple sub-problems, sub-issues, characteristics, or parameters to be determined, that are individually referred to as a criterion, $C_n$, 404, where n is an integer, and a plurality of criterion are collectively referred to as criteria. Identifying the set of relevant criteria may be critical to the synthesis of an accurate and comprehensive answer to a presented problem 402. The criterion 404 may be directly or tangentially related to a problem or issue 402. For example, in the windshield wiper air turbulence problem, a direct criterion (e.g. $C_1$) 404 involves optimizing the shape of the wiper blade to reduce air turbulence, and a tangential criterion 404 (e.g. $C_2$) involves choosing a material that maintains shape despite changes in wind velocity at variable vehicular speeds. Each criterion 404 may be assigned a weight, $W(c_n)$ 406, indicating the relative importance of the particular criterion 404 to the overall determination of a solution to the presented problem 402. In some embodiments, a rule or set of rules may assign greater weight 406 to criteria necessary for the functioning of a design than to optional, tangential, or aesthetic criteria. For example, in the problem regarding the design of a windshield wiper blade, a greater weight 406 may be given to the shape of the blade, and failure mode of materials, than to the cost of materials. The weight 406 may be presented as a fraction or percentage that the criterion represents in the scope of the problem 402 to be solved. As an example, if there are five (5) criteria 404 to be analyzed as part of a problem, $P_k$, 402 to be solved, each criterion 404 may have equal weight 406 (i.e. $W(c_1) \ldots W(c_5)=0.2$), or in other embodiments the assigned weights 406 are unequal (e.g. $W(c_1)$, $W(c_2)=0.2$, $W(c_3)=0.4$, $W(c_4)$, $W(c_5)=0.1$). For example, the weight, $W(c_n)$, 406, may be assigned by one or more human users 400 or by an automated user 400, such as a set of computer operations following a programmed rule or set of rules. In some embodiments, the criterion 404 and its respective weight 406 are defined individually by each user 400, in other embodiments they are determined collectively by a group of users 400, and in still other embodiments, they are automatically determined using one or more rules implemented by computer operations. In a situation where an individual user 400 defines one or more criterion 404, there may need to be agreement among users 400 that the proposed criteria 404 adequately represent a necessary and complete set that defines the problem 402 being investigated, and that the assigned criteria weights 406 are rational. In some embodiments, criteria 404 are predefined to which all users 400 must conform. In various embodiments, users 400 may choose to answer any one or more criteria 404, while abstaining from answering other criteria 404 within a set of criteria. In FIG. 4A arguments $A_n$, 408, where n is an integer, address an individual criterion 404. For example, $A_2$ corresponds to an argument 408 in association with criteria 404 $C_2$. In some embodiments, a single argument 408 may examine multiple criteria 404 simultaneously. A submitted argument, $A_n$, 408 is based on supporting evidence, $E_{nr}$, 412, where "r" is an integer for each piece of evidence cited, and "n" corresponds to the argument to which the evidence is attached. Each argument 408 proposed by a user 400 is assigned a quality score, $S(a_n)$, 410 indicating the quality of the argument 408. The argument quality score 410 may be determined manually by human users 400 using a rubric or set of rules, for example, or automatically using one or more rules implemented by computer operations. In some embodiments, an argument quality scoring methodology or metric may be based on a rule or set of rules that assign values to an argument's 408 logical basis, the repeatability of empirical data, and the accuracy and precision of a model. A measure of how accurately and completely the cited evidence 412 substantiates the arguments 408 offered may be expressed in the argument quality score 410, the evidence quality score 414, or the unified quality score 416. For example, a logical argument 408 presented with evidence 412 that does not strongly correlate with the argument 408 weakens the argument 408 and may be expressed by a rule that directly affects the unified quality score 416. In other embodiments, arguments citing weak or irrelevant evidence may weaken the evidence quality score 412 directly, and be indirectly reflected in the unified quality score 416 when the evidence quality score 412 is included in determining the unified quality score 416. In various embodiments, each argument 408 may be supported by one or more pieces of evidence 412. In FIG. 4A, for example, argument 408 $A_1$ is supported by a single piece of evidence 412 $E_{11}$, and argument 408 $A_2$ is supported by three pieces of evidence 412 $E_{21}$, $E_{22}$, and $E_{23}$.

Some embodiments may include an evidence quality score, $S(e_{nr})$ 414, that reflects the quality of the evidence 412 based on characteristics such as the relevance, verifiability, representation, and actionability of presented evidence 412. The quality of source material may be evaluated and scored. A metric may be specified as a rule or set of rules that determines and compares the relative quality of evidence 412. In some embodiments, the evidence quality score 414 may be determined by one or more rules and scaled numerical values may be assigned to scoring parameters that determine the evidence quality. These parameters may reflect the veracity and probity of the evidence 412 and its source reputation, for example. Parameters may include whether the scholarly research and reporting was refereed (e.g. peer reviewed), the scholarly reputation and impartiality of the author and publication in which the results were reported, the evidence type and authenticity, whether the evidence 412 was corroborated by other researchers, and assessment by other users 400. Other parameters may include the quality and quantity of references cited by authors, consensus by experts, the relevance and scholarly impact of the cited evidence 412, and the amount of consensus by other users 400. For example, evidence 412 that is sourced from a peer-reviewed scientific journal may be more reliable and therefore assigned a superior score over a citation from a non-peer reviewed journal. Other metrics may include third-party citation ranking and citation influence scores.

In some embodiments, evidence quality scores, $S(e_{nr})$ 414, are combined with the argument quality scores, $S(a_n)$ 410, following a set of rules to determine one or more unified quality scores, $S(u_n)$ 416. The unified quality scores 416 may be used to ascertain the relative ranking of arguments 408. Each of the presented arguments 408 addressing the various criteria 404 may be aggregated (e.g. their salient points merged) to form a cohesive answer, $A_k$, 418, to a presented query, problem, or issue 402, and the unified quality scores 416 may be combined using one or more rules (e.g. averaging) to form an answer quality score, $S(A_k)$ 420. The most favorably scored arguments for each criterion may be aggregated to form the SA. Determining a set of criteria 404 to be analyzed as part of a problem, $P_k$, 402, permits a finer granularity to problem analyses.

The rules used to determine argument and evidence scores may be implemented on "crisp" or "fuzzy" data sets, and scoring rules may use Boolean logic or fuzzy logic. For example, an evidence quality score may include the "scholarly reputation of the publication". Defining precise values for a "scholarly reputation" may be impractical because of the nature of the metric is imprecise, or achieving an accurate measurement may be too computationally complex, for example. Instead, an input parameter may be described by a linguistic variable (e.g. "scholarly reputation of the publication"), and values may be defined as members in a set with more than one linguistic term (e.g. "very high", "high", "average", "low", "very low"), each of which may be defined by a membership function. The membership functions map the "crisp" input values to corresponding "fuzzy" linguistic terms. Membership functions may model "crisp" data sets or be arbitrarily chosen, and common shapes of the membership functions include triangular, trapezoidal, linear, Gaussian or singleton. Additional values for parameters may be mapped to linguistic variables and members in a set may be assigned to linguistic terms described by membership functions. For example in addition to the "scholarly reputation of the publication", other parameters may affect evidence quality and may impact determination of an evidence quality score. Example parameters, some of which may be described by a fuzzy set and others described by a crisp set include scholarly reputation of the researcher, whether a published article is refereed, the authenticity and relevance of the evidence cited, and the degree of corroboration of the research results. One or more rules in the form of IF . . . THEN statements map the relationships between the input fuzzy variables, the respective membership functions, and an output variable. A fuzzy logic inference process is performed on the aggregate of the fuzzy values converted from input data by applying the rules and logically combining the results of the rules. A defuzzification process is performed using a normalizing method, for example, that converts the fuzzy output values to a crisp output value to yield an evidence quality score 414. In other embodiments, a hybrid approach, combining both Boolean and fuzzy logic for score determination may be used as well. The example above is directed toward evaluating an evidence quality score 414. Argument quality scores 410 may be derived in a similar manner using fuzzy logic or Boolean logic.

In various embodiments, computing system functionality may be improved using criteria because arguments are assessed with finer granularity, which permits optimizing system resources (e.g. bandwidth, and processing power), by focusing resources only on those criteria of a problem that are being assessed or reassessed.

Figure 4B:
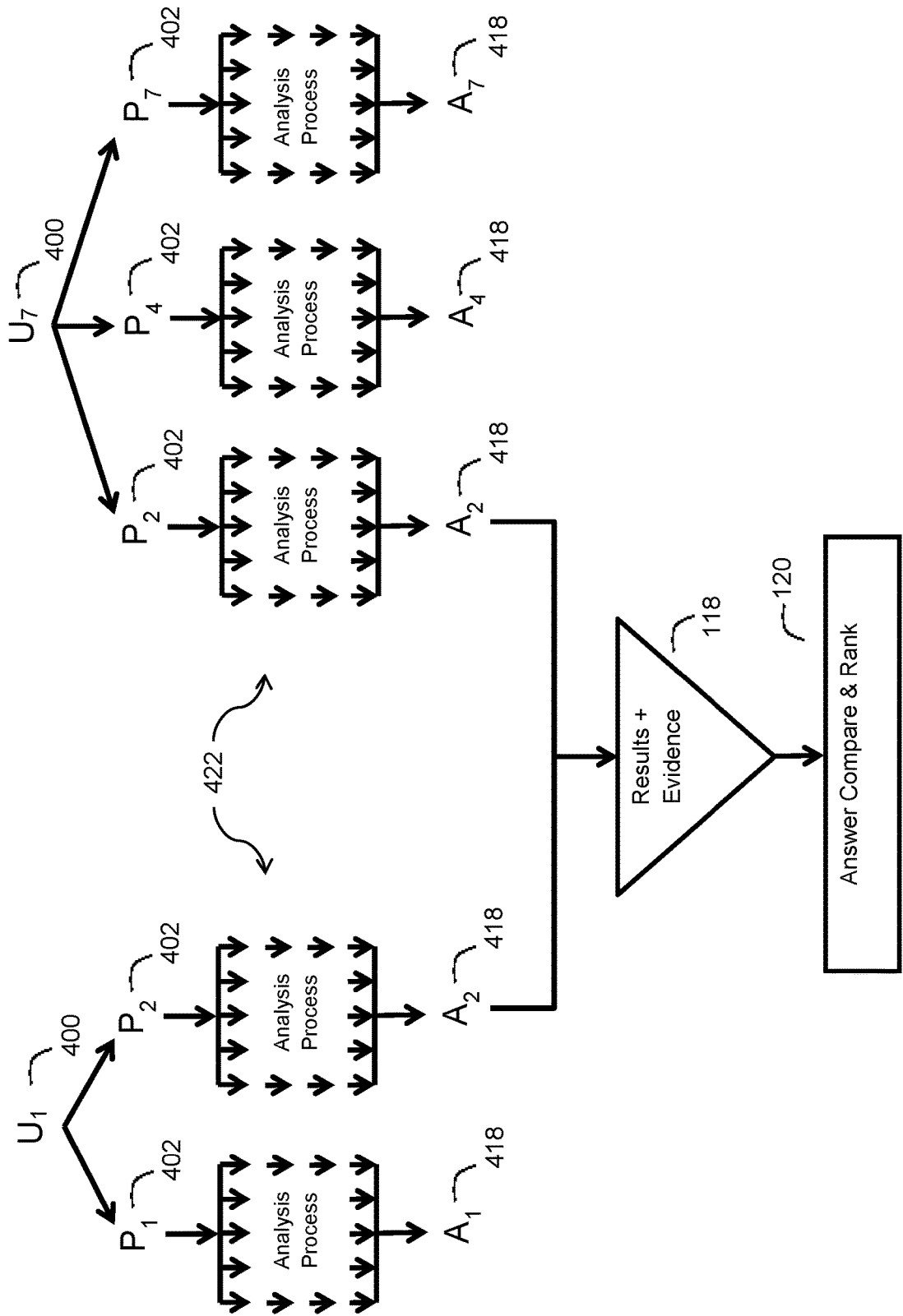
FIG. 4B shows elements of an example expression analysis for multiple contributing entities according to some embodiments of the disclosed subject matter.

FIG. 4B illustrates an exemplary flow diagram for analysis of multiple expressions by multiple contributing users. In some embodiments, contributing users may interact over a distributed network such as a Wide Area Network (WAN), or Local Area Network (LAN), while in other embodiments, the users may be elements of the same computing system (e.g. multiprocessors in a single system). A user, Uj 400, may choose to evaluate any number of expressions, $P_k$, 402, which may be in the form of a question, a statement, or a query regarding an issue or problem to be solved or analyzed. Users 400 may perform the multiple expression analyses consecutively (e.g. serially) or concurrently (e.g. in parallel), in partial or in whole. For example, in FIG. 4B, user 400 $U_1$ is shown to analyze expressions 402 $P_1$ and $P_2$, while user 400 $U_7$ is shown to analyze expressions 402 $P_2$, $P_4$, and $P_7$. Each user 400 may follow the analysis process 422 as described in conjunction with FIG. 4A, for evaluating expressions 402, which includes selecting criteria 404, synthesizing arguments 408, and providing supporting evidence 412. In various embodiments, arguments 408 and evidence 412 are scored, aggregated, and an answer, $A_k$, 418 is generated as responses by each user 400. User answers 418 addressing the same question, problem, or issue may be aggregated, FIG. 1, box 118, FIG. 4B, box 118, and evaluated against one another by comparing and ranking the arguments and evidence FIG. 1, box 120, FIG. 4B, box 120. In the example of FIG. 4B, users 400 $U_1$ and $U_7$ analyze expression 402 $P_2$ in common. The results may be evaluated against the SA, stored, and presented. If an answer quality score FIG. 4A, 420 exceeds the SA quality score, the SA may be replaced by the improved answer, for example. In some embodiments, when multiple arguments 408 comprise an SA, if an argument quality score 410 exceeds a particular argument quality score in the SA, then only the improved argument 410 selectively replaces the corresponding argument of the SA. As a result, the SA may be incrementally improved, one argument, with one or more criterion, at a time. Likewise, if an evidence quality score for an item of evidence exceeds an evidence quality score for an equivalent item of evidence in an SA, the item of evidence may append to or replace the item of evidence in the SA. The results may be compared FIG. 1, box 120, ranked box 120, and stored FIG. 1, box 124 on one or more connected computing systems. The results may also be presented to users FIG. 1, box 128 through an output device, such as a computer display using an Internet browser or other software application. In various embodiments, the results are not presented, but rather used for continued processing by a series of pipelined operations.

In various embodiments, an argument 408 and supporting evidence that comprises a portion of an analysis of a natural language expression 402 in a particular domain may be applied as an argument 408 in an analysis of a natural language expression 402 in a different domain. For example, an argument 408 describing how geckos climb walls using tiny hairs and Van der Waals forces may be applied to adhesives engineering. The first domain is biology, while the second is material science. Data mining, NLP, machine learning, statistics, and various predictive modeling technologies may be applied to facilitate predicting applicability of an argument to analyses of other natural language expressions, within the same or a different (e.g. analogous) domain. The organized and efficient application of arguments 408 and supporting evidence 412 across domains may fundamentally improve the speed, throughput, and answer variety of problem solving by AI systems.

The criteria-based approach to problem solving in the present disclosure offer advantages over methods that merely retrieve and report answers extracted from treatises and other writings by experts because those writings may be incomplete, outdated, or lack sufficient evidentiary support. The writings may be incomplete by not comprehensively addressing elements of a problem to be solved, or may fail to disclose a methodology, for example. Other deficiencies of referenced treatises may include outdated information due to changes in technology since the date of publication, for example, and writings may lack evidentiary support because evidence 412 is not cited, has been refuted, or is not of high quality.

Document search and retrieval using keyword searches on Internet search engines (i.e. "organic" searching) can be inefficient and error-prone when document quality is not assessed by an AI system prior to use. Repeatedly assessing relevance and quality of a referenced document on subsequent searches can wastefully use bandwidth and processing power. The present disclosure solves this technical problem by assessing and scoring arguments 408 and evidence 412 using rule-based processing, and ranking the arguments 408 based on the quality scores. The arguments 408, evidence 412, and corresponding quality scores 410, 414, 416 may be stored, grouped, and sequenced to increase throughput and efficiency in the event that the same or similar inquiries are performed. The methods of the present disclosure provide a functional improvement to the search and retrieval of data by a computing system. In addition, identifying and classifying relevant criteria 404 associated with problems, solving for these criteria 404, and storing the results, further improves computing functionality for the same or similar criteria that may be assessed. Identifying and solving for multiple criteria 404 connected with a particular problem or issue helps the AI system selectively extract the most relevant and accurate arguments 408 from writings, even when other arguments 408 within the same writing are shown to be inaccurate, misleading, or false.

E) Evidence Gathering, Scoring, and Verification Detail

The merit of an argument FIG. 4A 408 may depend upon the quality of the supporting evidence FIG. 4A 412. In some embodiments, evidence 412 supporting an argument 408 may be collected, stored, and presented to users 400. Evidence 412 may be located and retrieved from local or networked computers. In various embodiments, evidence gathering may be manually performed by human users 400 (e.g. curators, analysts, experts, commenters), and may be assisted by automated computer operations that facilitate evidence 412 gathering, such as data mining operations. In some embodiments, evidence 412 may be automatically gathered by computing entities 400 without human entity 400 intervention. Evidence gathering computing tools that are accessible from networked computers may provide search capabilities, based on keywords or author name, for example. Electronically accessible evidence 412, such as excerpts from professional journal articles available through a network, may be retrieved by a computing system and a rule or set of rules may define a scoring protocol to provide an evidence quality score 414. Document excerpts may be quoted, interpreted, or otherwise analyzed to determine the value of content in support of an argument 408.

Figure 5A:
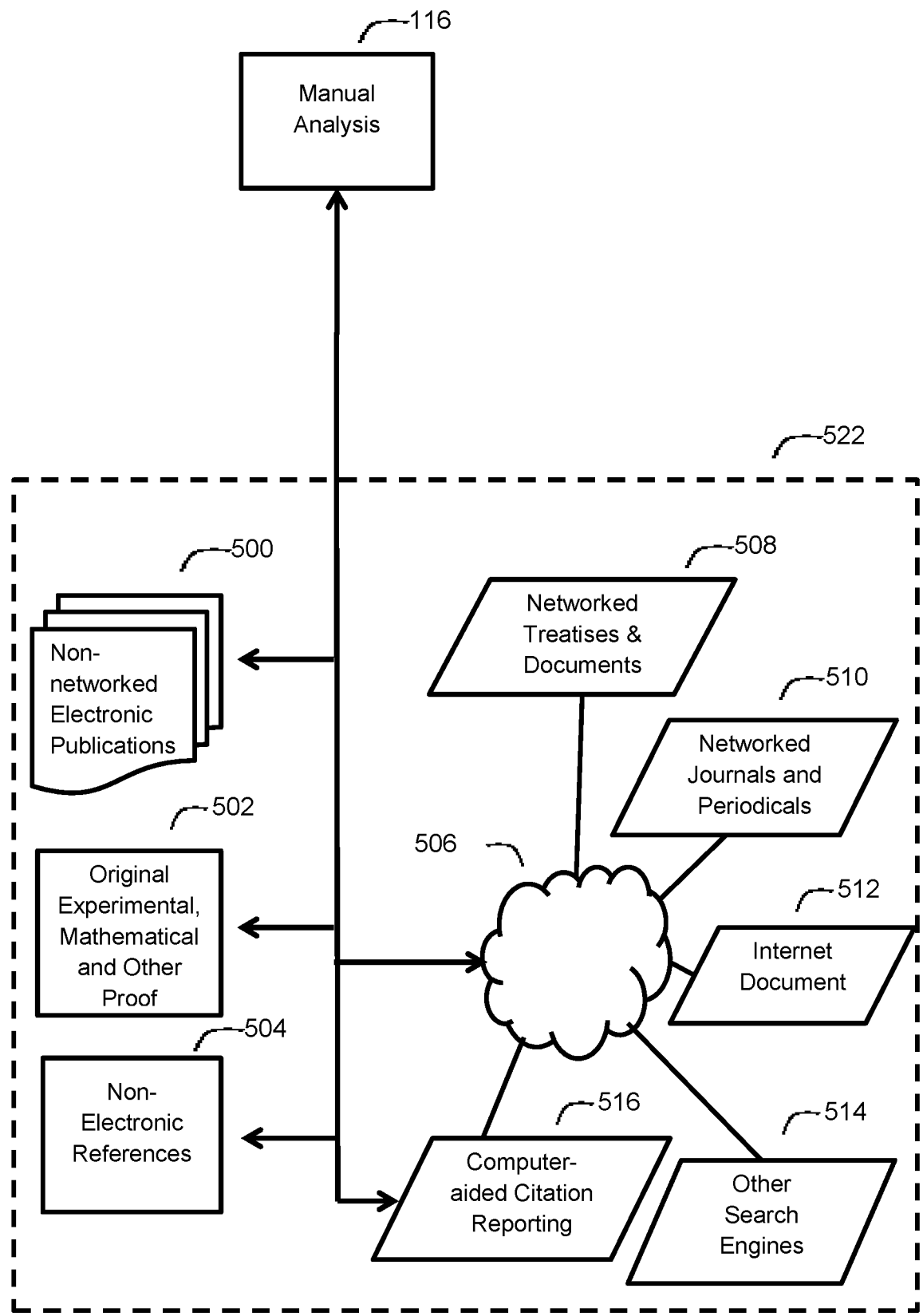
FIG. 5A shows example evidence types associated with a manual analysis according to some embodiments of the disclosed subject matter.
Figure 5B:
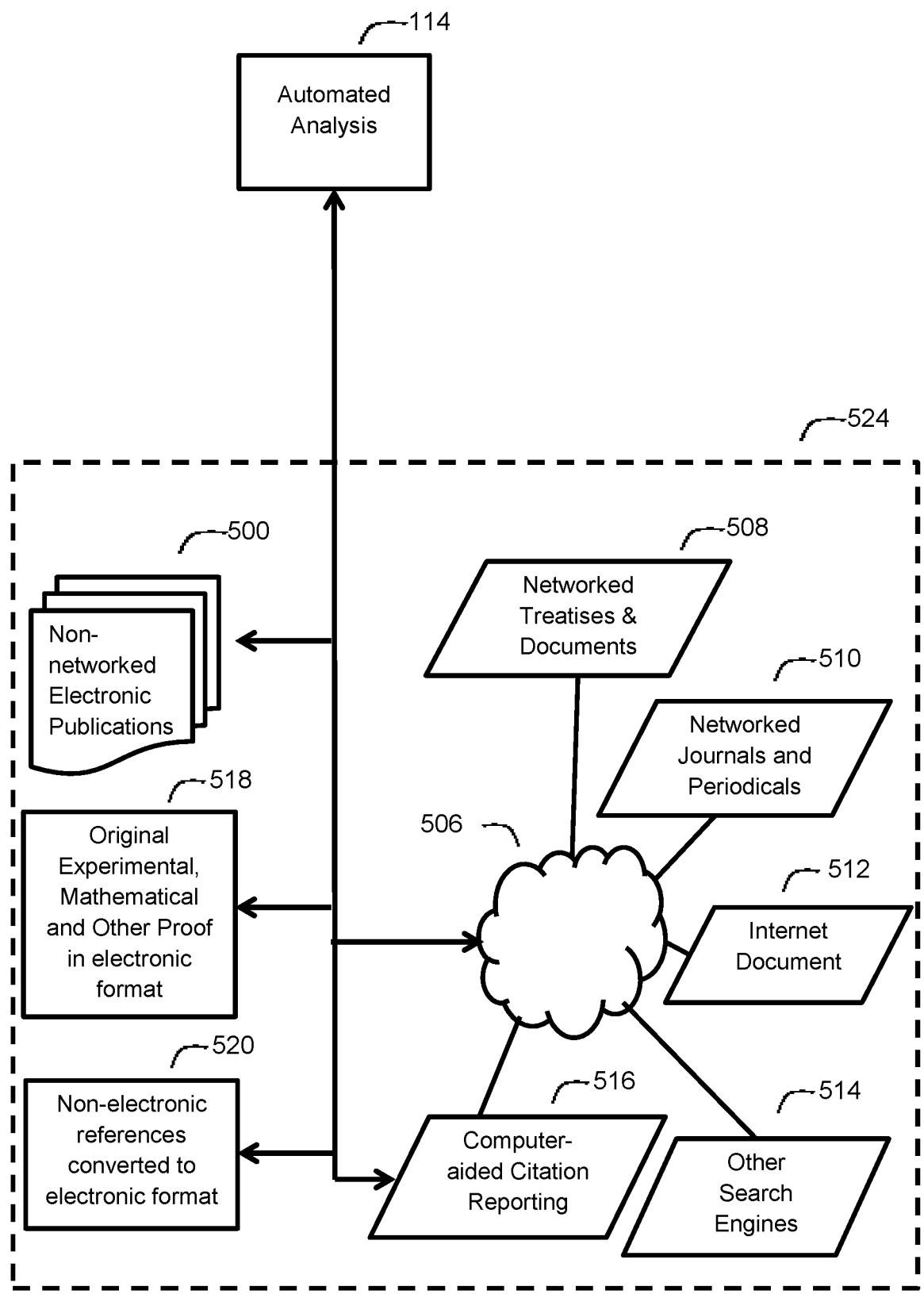
FIG. 5B shows example evidence types for an automated analysis according to some embodiments of the disclosed subject matter.

FIG. 5a and FIG. 5b are block diagrams showing some example types of evidence 412 that may be automatically and manually gathered for various embodiments. FIG. 5a shows sources of evidence 412 that may be available to perform a manual analysis FIG. 1, box 116. Human users 400, including curators, and recognized experts may access a collection of evidence 522 from electronic and non-electronic sources. FIG. 5b shows evidence sources available for automated analyses FIG. 1, box 114. An automated user, such as a software agent on a computing system, may access a collection of evidence 524 in electronic format. As shown in FIGS. 5a and 5b, electronically available evidence 524 includes networked and non-networked sources. Non-networked sources include non-networked electronic publications 500, original empirical evidence (e.g. experimental, mathematical, and observed verification) box 502, and other non-electronic references (e.g. manuals, treatises, paper-based documents) box 504. Non-electronic evidence box 504 and the portion of empirical evidence in non-electronic format box 502 may be made available for automated analysis following conveyance into electronic format FIG. 5b, boxes 518, and 520 by OCR, for example. In various embodiments, networked sources of evidence may be retrievable over a computer network 506, and may include networked treatises and other documents box 508, networked journals and periodicals box 510, and information on Internet servers box 512 such as audio/visual materials. Search and retrieval of networked evidence may be assisted by search engines box 514 and include generalized search engines or search engines dedicated to a particular domain, or organization.

Some embodiments may include automated citation reporting and formatting operations box 516 to help search, prepare, and disclose reference citations. Accurate source disclosure is important for facilitating information sharing and verification, however, manually created citations are susceptible to recording and transcription errors. Consistent, and accurate citation reference formats may be maintained by automating the citation generation process. This may be performed by computer operations available on a non-networked computing system or through networked links with applications available on networked computing systems. Citation formats vary depending upon the field of research, the journal, and the publisher. Citation disclosure tools may be customized to conform to established citation standards. Some common formats include ACS (American Chemical Society), AIP (American Institute of Physics), MLA (Modern Languages Association), APA (American Psychological Association), AMA (American Medical Association), NLM (National Library of Medicine), ASA (American Sociological Association), APSA (American Political Science Association), AP (Associated Press), Chicago, and Turabian. Legal citations in the US typically follow the Bluebook and the ALWD Citation manual formats. References from Internet web-sites refer to a Uniform Resource Locator (URL) and a date of access. Adhering to reference citation standards within an academic discipline may facilitate communication of references among users 400.

In various embodiments, references may be retrieved during a search for supporting documentation, and citations may be manually or automatically copied and inserted into appropriate fields. Alternatively, applications that facilitate automatic source disclosure may request a user 400 to provide at least a partial submission of citation reference information such as title, author, journal, volume, date, publisher, page and/or other reference identifying information, whereupon a series of computer operations provide the completed and formatted reference citation based upon the provided information. This may be accomplished, for example, using a relational data association between a particular reference source and the corresponding citation format. As an example, a referenced citation to the Journal of the American Medical Association may automatically cause citation formatting operations adhering to the AMA citation format specifications. Various embodiments also provide an electronic link to the source document so that other users may access and examine the cited reference.

In some embodiments, an automated or manual substantiation may be performed to ensure that a cited reference is relevant to the argument proposed, and that the evidence FIG. 4A, 412 discloses what is claimed in the argument FIG. 4A, 408. Computer operations, for example, may perform NLP assessment, keyword search, and logic operations to verify that the disclosed reference citation is correct and supportive. A manual assessment may also be performed by at least one user 400. Evidence 412 may be offered by users 400 in support of, or refuting, arguments 408 proposed by a different user 400. In some embodiments, the offered evidence 412 may be supplied without providing additional arguments 408. The assessment results may be reported to other users 400 and electronically stored in association with the reference citation, which may be later accessed to help identify inadequate argument 408 and evidence 412 combinations. Such an assessment is particularly useful for evaluating and scoring the quality of argument 408 and evidence 412 submissions, for example.

F) Data Archive Detail

Figure 6:
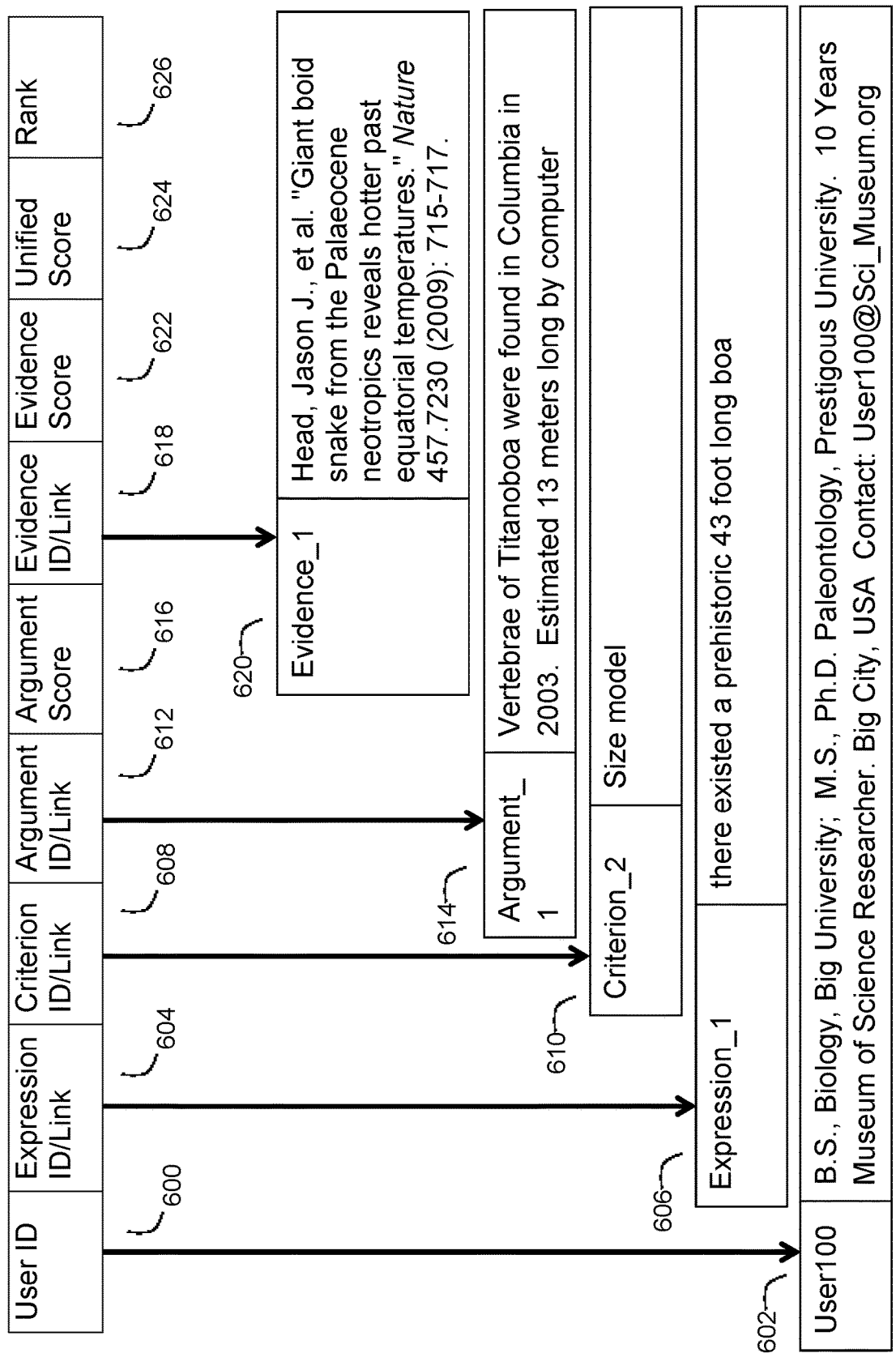
FIG. 6 shows database fields associated with an example expression analysis according to some embodiments of the disclosed subject matter.

The results of any expression analysis, whether collaboratively or individually determined, may be stored in non-transitory memory, searched and recalled. The expressions and analyses may be collected, grouped, and connected manually or electronically in an archive (e.g. in a database). FIG. 6 shows an example embodiment of a database record template associated with an expression FIG. 4A, 402 analysis performed by a user FIG. 4A, 400. The architecture of the data archive may be implemented in any available structure, such as a flat file database or a relational file database. A unique user identifier (ID) field 600 may be specified, for a human user 400 or for an automated user 400, and a user record 602 of user identifying information may be associated (e.g. linked) with the ID field 600. The linked user record 602 may be retrieved from a local system or from a remote server, and may be associated with a third-party application, such as a social networking application on an Internet site, for example. A field identifying the expression 402 to evaluate may be identified by an expression ID 604, for example, and the expression 402 may be stored in a retrievable expression record 606. The user 400 may specify criteria FIG. 4A, 404 upon which the analysis of the expression 402 is based. A field is provided for a criterion ID 608, for example, that refers to a criterion record 610. The argument FIG. 4A, 408 proposed by a user 602 may be referenced by an argument ID field 612 that specifies a link to the argument record 614. An Evidence ID field 618 associated with the supporting evidence FIG. 4A, 412 specifies the storage location of the evidence record or the location of a record of a reference citation 620. An argument quality score field 616 specifies the argument quality score FIG. 4A, 410 determined for the argument record 614. An evidence quality score field 622 specifies the evidence quality score FIG. 4A, 414 determined for the substantiating evidence 620 referenced by the evidence ID field 618. The quality scores may be manually or electronically determined. The argument quality score 410 and evidence quality score 414 may be unified using rules and a unified quality score field 624 may store the value of the unified quality score 416. A field may indicate the relative rank 626 determined for an argument record 614 relative to scores of other submitted argument records 614 connected with analyses of the same, or equivalent, expression records 606. The unified quality score 416 may be used to determine rank 626. In some embodiments, each expression ID 604 and criterion ID 608 combination may relationally connect with analyses of equivalent expression ID 604 and criterion ID 608 combinations, and these analyses may be compared and contrasted. As a user 400 provides analyses of additional expressions 402, the number of data records associated with a particular user ID 600 increases.

G) Example User Interface (UI)

In various embodiments, a UI may represent results of analyses by users, however, analyses may be determined and used by computing processes without visual representation. FIG. 7A illustrates an embodiment of an interactive user interface for an example fact verification task. The example User Interface (UI) shows an expression FIG. 4, 402 to be evaluated, such as an alleged fact 700 regarding a particular topic 704, within the section (e.g. a frame) that describes the expression to be analyzed 702. Topics 704 may relate to subjects in fields of academic study, and other classifications of domains. In the example shown, a "Science" topic 704 is examined that tests the veracity of a claim of an alleged fact 700 that " . . . there existed a prehistoric 43-foot long boa . . . ." In some embodiments, the UI may include a "system response" section 706, which may present the results of an analysis of the expression 708. In the example shown, the response indicates the statement to be "correct" and shows the result of the analysis including relevant reference citations. The answer disclosed in the "system response" section 706 may be an SA previously determined, stored, and recalled or may be the result of a computer analysis in real-time, for example. The verifying evidence FIG. 4, 412 shown in support of the analysis in the example of FIG. 7A 708 are reference citations to Internet Universal Resource Locator (URL) addresses of articles available on the Internet. The first reference is a URL to a site of a Peer-reviewed journal and the second reference is to a URL of a video on a Website hosting non-peer-reviewed content. In some embodiments, evidence 412 that has been peer reviewed is scored higher, imparting greater confidence in the results than evidence 412 that is not peer-reviewed. Peer-reviewed sources may vary in reference quality, and a rule with scaled scoring may be used. An answer quality score 420 for the SA may be determined and displayed 710. In the example shown, the score of "85%" reflects a high confidence in the veracity of the alleged fact.

An example user analysis section 712 is also shown in FIG. 7A, which functions to provide a section for substantiated user arguments FIG. 4, 408. For example, in this section, users 400 may propose arguments 408 for and against the veracity of an alleged fact, and provide evidence 412 in the form of reference citations to substantiate the presented arguments 408. In the example embodiment shown in FIG. 7A, unique user ID's 714 are shown, for example, by an identifier such as a name, or number, and in other embodiments, users 400 may remain anonymous. In various embodiments, the user ID 714 shown may be logically linked to a stored record FIG. 6, 600, which, in turn, may be logically linked to records of additional user information 602 such as user qualifications and contact information in the case of human users, and unique identifiers for automated users. Both automated user 400 and manual user 400 responses may be shown in the answer response field 712. Criteria 404 upon which an analysis is based may be shown in a criterion ID field 716 that, in various embodiments, associates with a criterion ID record FIG. 6, 608, that links with a criterion record 610, for example. Any number of criteria 404 may define a complete and accurate solution to a problem 402 and each criterion 404 may be individually analyzed. A listing of arguments 718 may be displayed; where each argument shown is associated with an argument ID field (or record) 612 linked with one or more argument records 614 that store user arguments 408. As an example, an analysis may argue for or against the veracity of an alleged fact as it applies to the criteria 404 presented in the criterion record 610 associated with the argument record 614. An item of evidence 412 may be associated with an evidence ID 618 and displayed in an evidence listing 720. The evidence ID 618 may be connected with one or more evidence records 620 that provide references to substantiating evidence 412. In various embodiments of a UI, if the device limits the display area in which to show a complete text record, a popup window or a link to another document may allow a full-text view or the text may be truncated, abbreviated, or split into multiple views to conform with the limitations of the UI, for example. In various embodiments, an argument quality score 410 may be determined, stored, and presented to users 400. The argument quality score 410 may be used along with one or more evidence quality scores 414, and the criterion weight 406, for example, to determine a relative rank 626 of a user's argument 408. In some embodiments, the method of ranking compares the unified quality scores 416 using one or more rules to determine a numerical distribution that may be used to sequence arguments and provide a ranking of the arguments. The ranking may be stored in a record FIG. 6, 626, and displayed 724. In some embodiments, postings by multiple users 400 having similar or corroborating arguments 408 may increase the argument quality score 410, thereby cumulatively adding to the veracity of a proposed argument 408. In some embodiments, an evidence quality score 414 may be presented 722, or if multiple items of evidence are submitted, an evidence quality score 414 may be determined, by combining multiple individual evidence quality scores 414 using a one or more rules, and thereafter presented 722. The displayed evidence quality score 414 may be shown 722 using relative or absolute units. The units shown in the example of FIG. 7A, are relative, "88%" indicating greater quality of evidence 412, while "22%" indicates a lesser quality. Some embodiments provide a field for users to indicate Agreement (A) or Disagreement (D) 726 with the comment of another user 714 listed in the user response section 712. For example, if evidence 412 is improperly interpreted by a user 400, other users 400 may Disagree (D) with the argument. In some embodiments, for example, arguments 408 submitted by users 400 may be comparatively ranked 724, based on a combination of the unified quality score 416, substantiation (e.g. corroboration) by other user arguments 408, with some weight given to agreement of other users with the argument 726.

FIG. 7B shows a user interactive UI for an example problem solving task. In the example shown, the topic of discussion 704 is shown as the "Economy". The expression 402 analyzed is shown as a question 700 to be solved. An automated response from a computing system, for example, may be shown in a section 706, but in this example, the "system response" 706 is shown as "indeterminate". An "indeterminate" result may occur, for example, when an expression 402 cannot be disambiguated by the computing system, no answers are available from storage, the automated analyses are inconclusive, an answer or evidence quality score for the answer does not meet a threshold value, an answer is available but relies on input of additional relevant data, or the complexity of the question is outside the system capabilities. Users 400 may collaborate (or compete) on problem solving tasks by submitting arguments 408 and/or evidence 412 and reading and responding to previously submitted arguments 408 in an answer response section 712. In various embodiments, each user 400 may be identified 714, and the proposed arguments 408 may be presented in a field 718 in a displayed UI, along with at least one reference to substantiating evidence 720. An argument ID FIG. 6, 612 and its associated argument 614, and the evidence ID 618 and its associated evidence 620, may be linked in data storage. In some embodiments, multiple criteria FIG. 4, 404 may define a problem, and users 400 may indicate the criteria 404 upon which the presented argument 408 is based by selecting one or more criterion 404 from a list. In other embodiments, a means for entering the criterion 404 in text form, for example, may be provided for the user 400. One or more criterion 404 may be displayed 716 and linked to a criterion ID 608. An argument quality score FIG. 4A, 410 may be determined for an argument 408, and displayed in the UI. The cited evidence 412 may be presented 720, scored 414 and the evidence quality scores may be presented in the UI 722. Users 400 may indicate agreement (A) or disagreement (D) with displayed arguments 718 by activating a software switch in the UI, for example. Users 400 may also provide detailed arguments 408, and/or evidence 412 corroborating or refuting arguments provided by other users 400. For example, the UI of FIG. 7B presents a user answer response field 712 that shows an argument 718 by "User 41" in response to an argument 718 provided by "User3". In the UI of FIG. 7B, argument quality scores 410 are not shown, however in some embodiments, arguments 408 are ranked according to argument and evidence quality scores 410, and 414. Records may be stored, retrieved and presented in an arrangement that corresponds with the ranking 724, as exemplified in the answer response field 712 of FIG. 7B. In this way, answer quality may be iteratively improved as reflected in improved answer quality scores.

H) System Detail

Figure 8:
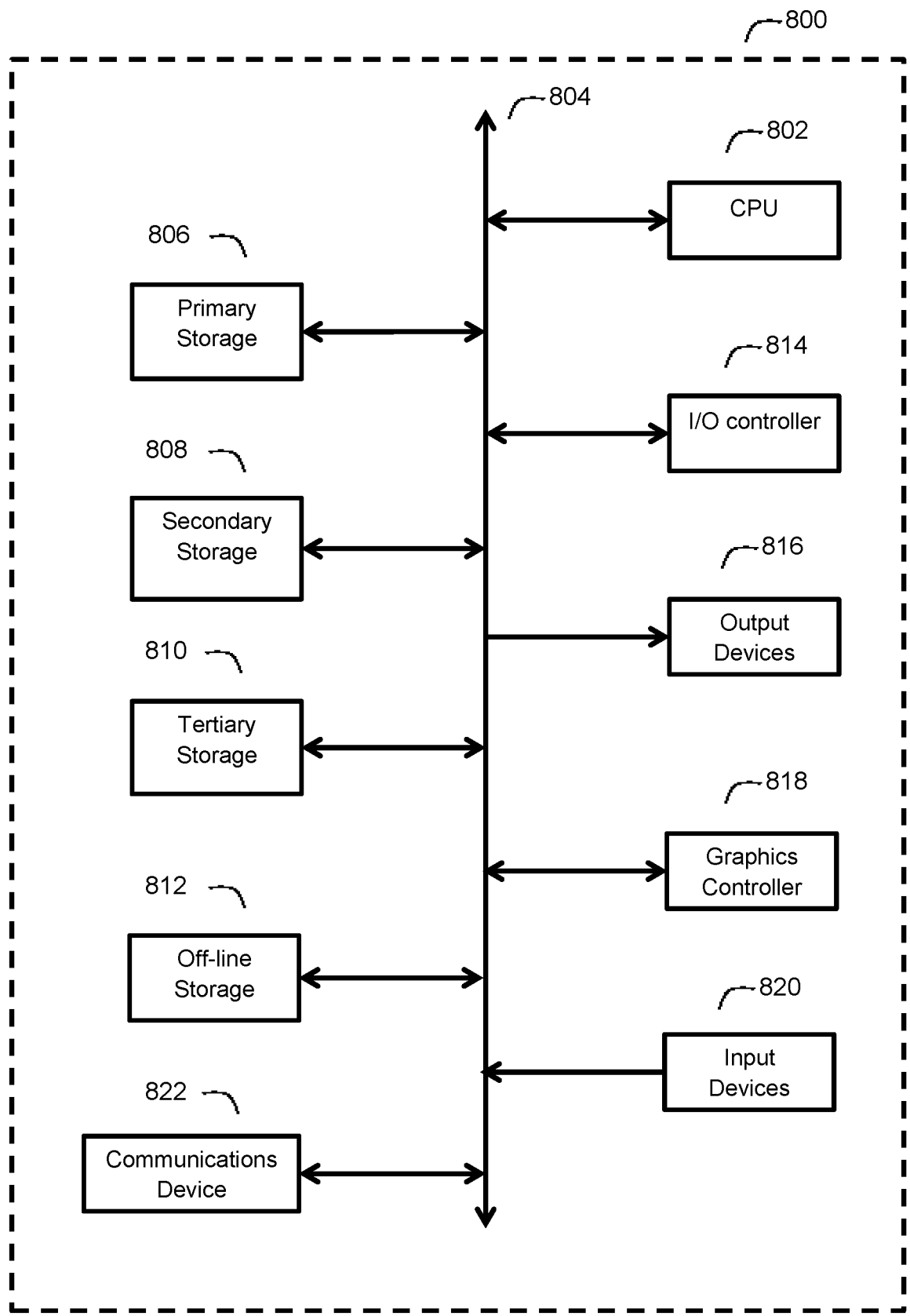
FIG. 8 shows elements of an exemplary computing system associated with some embodiments of the disclosed subject matter.

FIG. 8 is a diagram of an exemplary computing system 800 for implementing various embodiments of the disclosed subject matter. A computing system 800 includes, for example, desktop computers, laptop computers, server computers, tablet computers, wearable computing devices, "smartphones", embedded computers, cellular phones, gaming computer devices, Virtual Reality (VR) and Augmented (AR) devices, digital music players, Silicon on Chip (SoC) systems, embedded systems, and other such computing devices. The computing system 800 may include at least one bus 804 that interconnects components of the computing system 800. The components may include at least one Central Processing Unit (CPU) 802, and at least one primary storage 806 (e.g. RAM, ROM, and Cache memory). The CPU 802 may include at least one arithmetic-logic processor, and at least one process controller. Access to other memory types may be provided that facilitate data and program storage and retrieval. These non-transitory memory types include secondary storage 808 (e.g. hard disk drives, SSD drives, and optical drives), tertiary storage 810 (e.g. mirrored hard drives), and off-line or removable storage 812 (e.g. USB flash drives, SD cards, and microSD cards). At least one input/output controller 814 may manage data communication from input devices 820 (e.g. keyboards, computer mice, trackpads, styluses, and touch enabled displays). The input/output controller 814 may manage data communication with output devices 816 (e.g. printers, computer and tablet displays, VR and AR displays, and "smartphone" displays). Some embodiments include at least one graphics processor or graphics controller device 818. Embodiments of the present disclosure may also include at least one communications device 822 to facilitate communications with other devices through a communications channel or network and Internet-of-Things protocols may also be supported. Communications devices 822 include modems, Radio Frequency (RF) devices, communications chips, communications circuits on system chips, and the like. Communications networks include broadcast or point-to-point networks, such as the Internet, Bluetooth, Local Area Networks (LANs), and Wide Area Networks (WANs), that are accessible through wired (e.g. landline) and wireless (e.g. WiFi, satellite, and cellular) communications. The connection may, for example, be point-to-point or through an intermediary Internet Service Provider (ISP), and through any number of devices on intermediary connected networks, and devices and software may be configured for a cloud computing environment. Each of the above mentioned components may be realized as discrete devices, or multiple functions may be integrated into fewer devices, such as Very Large Scale Integrated (VLSI) integrated circuits, embedded devices, and System on Chip (SoC) devices.

Computing system 800 operation may be initiated upon applying power and loading instructions into primary storage 806 from Basic Input-Output System (BIOS) code that may be stored in a non-volatile memory (e.g. ROM) and executed by at least one CPU 802. BIOS instructions permit proper initialization and operation of essential computing system hardware. Computer operating system, application instructions, and data may be stored in secondary storage 808 and transferred in portions, using one or more buses 804, to primary storage 806 as needed. A bus 804 also facilitates loading of operating system, application instructions, and data from primary storage 806 to a CPU 802, where at least one arithmetic-logic processor executes the instructions and performs operations on the data. Applications and data may also be stored on tertiary storage 810 and off-line storage 812 components, and may require physically connecting the media with the computing system 800 prior to accessing data.

In some embodiments, applications and data may be located on a device separate from the computing system 800, and may be accessible through other interfaces, such as a network. File sharing may be client-server or peer-to-peer based, for example. A client-server network provides remote access to applications and data from a designated file server (e.g. SaaS). A peer-to-peer network provides remote access to applications and data from any device capable of sharing, and giving permission to access data stored on that device.

All of the components shown in FIG. 8 do not need to be present to practice the present disclosure. In various embodiments, the components may be interconnected differently from shown, and additional components may be added.

Embodiments of the presently disclosed subject matter include computer-implemented operations and apparatuses for practicing those operations. Embodiments may be written in computer programming code (e.g. source code) as separate operations or as a complete computer program. The source code may be compiled into object code prior to storage on media, or it may be compiled at run-time. The programs may contain any amount of computer executable instructions and data as is necessary to realize the disclosed embodiments, and may be stored in machine readable format on any known form of storage media. Also, embodiments in the form of computer program code and data, for example, may be transmitted over at least one form of transmission medium (e.g. electrical wiring, optical interconnects, and free-space electromagnetic communications). The natural language expressions, for example, may be input through any form of wired or wireless communication medium, such as broadcast, and point to point electromagnetic signal communications. An analog or digital input can either be downloaded into system memory or it may remain unstored (e.g. streaming data). At the time when the machine readable code is loaded into, and executed by a computing system 800, the system becomes an apparatus for practicing embodiments of the disclosed subject matter. Computing hardware may be application specific (e.g. Application Specific Integrated Circuits (ASIC)) or general purpose (e.g. using Complex Instruction Set Computing (CISC), or Reduced Instruction Set Computing (RISC) based microprocessors). General purpose processors receiving programming instructions perform logic operations on data as directed by the instructions. A general-purpose processor may act as a special-purpose device when configured to implement a set of specified instructions to practice the disclosed embodiments. Computing systems 800 may include a combination of special purpose and general purpose devices. Example computing system 800 configurations adapted for special purpose include Artificial Intelligence (AI) systems, rule-based computing systems, Expert Systems, robotic systems, VR systems, AR systems, and gaming systems.

The foregoing description, for purpose of explanation, has been described with reference to specific embodiments. However, the illustrative discussions above are not intended to be exhaustive or to limit embodiments of the disclosed subject matter to the precise forms disclosed. Many modifications and variations are possible in view of the above teachings. The embodiments were chosen and described in order to explain the principles of embodiments of the disclosed subject matter and their practical applications, to thereby enable others skilled in the art to utilize those embodiments as well as various embodiments with various modifications as may be suited to the intended particular use.

What is claimed is:

1. A method for selectively evaluating a natural language expression for a knowledge-base comprising:
    performing a subjectivity analysis on a first natural language expression to determine at least one objective expression;
    selecting a selected objective expression from the at least one objective expression;
    receiving a first set of natural language data comprising an argument of an analysis of the selected objective expression, and at least one item of evidence substantiating the argument;
    connecting the argument with the at least one item of evidence based on at least one first data relationship;
    assigning an argument quality score to the argument;
    assigning an evidence quality score to each of the at least one item of evidence; and
    relationally storing in at least one knowledge-base, the argument and the at least one item of evidence, based at least on the respective magnitude of the argument quality score, the evidence quality score for each of the at least one item of evidence, and the at least one first data relationship.

2. The method of claim 1, further comprising:
    determining a source disclosure for each of the at least one item of evidence, the source disclosure selected from a group consisting of:
        data and metadata comprising a universal resource locator (URL),
        data and metadata comprising the argument,
        data and metadata comprising the at least one item of evidence,
        data and metadata comprising a database record,
        data comprising an assigned source disclosure, or
        combinations thereof;
    relationally storing in at least one knowledge-base, the source disclosure based on at least one second data relationship connecting the source disclosure to the evidence.

3. The method of claim 2, further comprising:
    selectively extracting the argument, and the at least one item of evidence from the first set of natural language data received via communication with at least one entity operatively connected to a network, the extracting based on syntactic rules, semantic rules, and contextual clues;
    assigning a first data representation for an entity identifier to each of the at least one entity;
    relationally storing, in the at least one knowledge-base, the argument with the at least one entity identifier based on a third data relationship operatively connecting the argument with the at least one entity; and
    relationally connecting, in the at least one knowledge-base, each of the at least one item of evidence with the at least one entity identifier based on at least one fourth data relationship operatively connecting the at least one item of evidence with the at least one entity.

4. The method of claim 3, further comprising:
    determining the argument quality score based at least on at least one argument scoring metric applied to the argument;
    determining the evidence quality score for each of the at least one item of evidence based at least on at least one evidence scoring metric applied to each of the at least one item of evidence; and generating a unified quality score based on a composite of the argument quality score, and the evidence quality score for each of the at least one item of evidence connected with the argument.

5. The method of claim 4, further comprising:
selecting at least one argument and the at least one item of evidence based at least on the respective argument quality score, and the evidence quality score for each connected at least one item of evidence; and
aggregating the selected at least one argument and the at least one item of evidence into a second set of natural language data representing an answer based at least on a natural language processing merging rule.

6. The method of claim 4, further comprising:
assigning at least one criterion to the selected objective expression;
assigning a criterion weight for each of the at least one criterion based at least on a quantified relationship between the at least one criterion and the selected objective expression;
assigning the respective criterion weight to each of the corresponding at least one criterion;
relationally storing the criterion and the assigned criterion weight in the at least one knowledge-base;
relationally connecting, in the at least one knowledge-base, the argument with at least one of the at least one criterion based on a fifth data relationship between the at least one criterion and the argument; and
relationally connecting in the at least one knowledge-base, the at least one item of evidence with the argument and the at least one criterion based on a sixth data relationship between the at least one item of evidence, the argument, and the at least one criterion.

7. The method of claim 6, further comprising:
for each of the at least one criterion connected with the argument:
assigning the argument quality score to the argument connected with the criterion, the argument quality score based at least on at least one argument scoring metric;
assigning the evidence quality score to the at least one item of evidence connected with the argument and the criterion, the evidence quality score based at least on at least one evidence scoring metric;
generating the unified quality score based at least on a composite of the argument quality score for the argument connected with the criterion, the criterion weight assigned to the criterion connected with the argument, and the evidence quality score respectively assigned to each of the at least one item of evidence connected with the criterion and the argument.

8. The method of claim 7, further comprising:
for at least a portion of the at least one criterion assigned to the selected objective expression:
aggregating into a portion of data representing an answer, the argument and the at least one item of evidence connected with the argument, for each of the at least one criterion in the portion, the aggregating based at least on one natural language processing merging rule; and
determining a comprehensive answer based on at least one argument and at least one item of evidence being connected with each criterion assigned to the selected objective expression; and
generating a second data representation identifying the comprehensive answer.

9. The method of claim 8, further comprising:
for the at least a portion of the at least one criterion assigned to the selected objective expression:
selectively extracting at least one argument and at least one item of evidence from the first set of natural language data comprising the at least one argument and the at least one item of evidence, the extracting based at least on the at least one criterion, syntactic rules, semantic rules, and contextual clues;
assigning the argument quality score for the at least one argument;
assigning the evidence quality score for each of the at least one item of evidence;
generating the unified quality score connected with each of the at least one argument and the at least one item of evidence based on a composite of the argument quality score for the at least one argument and the evidence quality score for the at least one item of evidence;
selecting, for each of the at least one criterion in the portion, the argument and the at least one item of evidence based at least on the magnitude of at least one from a group consisting of the argument quality score for the at least one argument, the evidence quality score for the at least one item of evidence, and the unified quality score; and
aggregating, for each of the at least one criterion in the portion, the respective selected argument and the respective at least one item of evidence, into the answer based at least on one natural language processing merging rule.

10. The method of claim 9 further comprising:
generating at least one answer quality score based at least on a composite of at least one from the group comprising the argument quality score for the at least one argument, at least one of the evidence quality score for each of the at least one item of evidence, and the unified quality score connected with each of the at least one argument;
generating at least one numerical distribution for each of a plurality of the argument quality scores, a plurality of the evidence quality scores, a plurality of unified quality scores, and a plurality of the answer quality scores, based at least on the magnitude of the respective scores;
assigning a sequence to the respective at least one argument, and the at least one item of evidence, based at least on the at least one numerical distribution;
storing, in the at least one knowledge-base, a third data representation identifying the position in the sequence for each argument and each at least one item of evidence in a group comprising the criterion, the argument, and the at least one item of evidence; and
retrieving from the at least one knowledge-base, in response to a request initiated by an entity, the argument and the at least one item of evidence in an order determined by the respective assigned sequence.

11. The method of claim 10, further comprising:
performing at least one text similarity metric operation to evaluate similarity of the first natural language expression to the answer, wherein a veracity measure of the first natural language expression is determined; and
assigning a fourth data representation corresponding to the veracity measure.

12. The method of claim 11 further comprising:
performing the subjectivity analysis on the first natural language expression to determine the at least one objective expression; and performing one of:
i. selecting the selected objective expression from the determined at least one objective expression based on at least one rule designating selection priority, or
ii. communicating, via at least one computing system, to at least one entity, the at least one objective expression, enabling the at least one entity to select the selected objective expression from the at least one objective expression, and receiving, via the at least one computing system, the selected objective expression selected by the at least one entity.

13. The method of claim 12, wherein the subjectivity analysis comprises:
processing the first natural language expression using a directory of classified expressions, to classify at least a portion of the first natural language expression into at least one subjective expression, at least one objective expression, or a combination of at least one subjective expression and at least one objective expression; and
processing the combination of at least one subjective expression and at least one objective expression, using the directory of classified expressions, to determine at least one objective expression,
the directory of classified expressions being generated using a method comprising:
generating at least one classification pattern from a group of expressions alternately classified as subjective or objective;
generating at least one classified expression, alternately classified as subjective or objective, based at least on applying the at least one classification pattern to at least one unclassified expression; and
joining the at least one classified expression to one of the group of expressions alternately classified as subjective or objective.

14. The method of claim 13, further comprising:
storing in at least one knowledge-base at least one item from a first group comprising: the first natural language expression, the at least one objective expression, the at least one entity identifier, the selected objective expression, the at least one criterion, the criterion weight associated with each of the at least one criterion, the at least one argument, the argument quality score, the at least one item of evidence, the source disclosure for each of the at least one item of evidence, the evidence quality score, the unified quality score, the answer, the answer quality score, the sequence assigned to a plurality of the at least one argument, the fourth data representation corresponding to the veracity measure, and the second data representation identifying the answer as comprehensive; and
displaying, in response to a request from the at least one entity, on a computing system having a display screen, a user interface having one or more frames, the frames displaying, in a space-constrained region, a listing of at least one item from the first group, the space-constrained region being displayed while the one or more frames are in an un-expanded state, and expanding the respective un-expanded frame to enable a complete viewing of the at least one item from the first group within the respective frame in response to a user selection of the at least one item in the respective un-expanded frame.

15. The method of claim 10, further comprising:
performing at least one natural language processing operation on the first natural language expression, wherein syntax and semantics is determined; and
generating at least one argument from the analysis of the first natural language expression based at least on the determined natural language syntax and semantics.

16. The method of claim 15, further comprising:
performing at least one natural language processing operation on a second natural language expression, wherein syntax and semantics is determined;
identifying a semantic equivalence between the first natural language expression and the second natural language expression based at least on a comparison between the sematic equivalence; and
substituting the first natural language expression by the second natural language expression based on the semantic equivalence.

17. The method of claim 16, further comprising:
inserting the argument of an analysis of a selected objective expression of the first natural language expression in a first domain as the argument of an analysis of a selected objective expression of the second natural language expression in a second domain, based on the semantic equivalence.

18. The method of claim 10, further comprising:
performing at least one natural language processing operation on the argument, and the at least one item of evidence, wherein syntax and semantics is determined;
determining a measure of relevance of the at least one item of evidence to the argument, based on the determined syntax and semantics;
determining a measure of substantiation for the at least one item of evidence, based at least on keyword matching, and the measure of relevance;
connecting the argument with at least one item of evidence that exceeds a threshold measure of substantiation; and
assigning a fifth data representation corresponding to the measure of substantiation.

19. The method of claim 10, further comprising:
receiving a first set of data, converted from a format comprising at least one of audio, video, image, and text, into a computer comprehensible format; and
presenting, the converted computer comprehensible first set of data in at least one of electronic, visual, aural, and tactile representations via a user interface on at least one computing system configured to operate interactively and in real-time on the network.

20. The method of claim 1, wherein the argument of an analysis of the selected objective expression comprises at least one of:
at least one argument relevant to the selected objective expression, at least one argument comprising an issue described by the selected objective expression, and at least one argument comprising a solution to a problem described by the selected objective expression.

21. A non-transitory computer-readable storage medium having embodied thereon instructions, which, when executed by at least one processor, perform steps of a method for automatically evaluating a natural language expression for a knowledge-base, the method comprising:
performing a subjectivity analysis on a first natural language expression to determine at least one objective expression;
selecting an objective expression from the at least one objective expression;
receiving natural language data comprising an argument of an analysis of the selected objective expression, and at least one item of evidence substantiating the argument;

connecting the argument with the at least one item of evidence based on at least one first data relationship;

determining an argument quality score for the argument of an analysis of the selected objective expression, based at least on at least one argument scoring metric applied to the argument; and determining an evidence quality score for each of at least one item of evidence substantiating the argument, based at least on at least one evidence scoring metric applied to the at least one item of evidence; and relationally storing in at least one knowledge-base, the argument and the at least one item of evidence, based at least on the respective magnitude of the argument quality score, the evidence quality score for each of the at least one item of evidence, and the at least one first data relationship.

22. A system for selectively evaluating a natural language expression, the system comprising:

at least one processor; and a non-transitory memory communicatively coupled with the at least one processor, the non-transitory memory storing instructions, which, when executed by the at least one processor, performs a method comprising:

assigning, by an entity, at least one criterion with a first natural language expression;

assigning a criterion weight for each of the at least one criterion based at least on a quantified relationship between the at least one criterion and the first natural language expression;

assigning the respective criterion weight to each of the corresponding at least one criterion based on a first data relationship connecting the respective criterion weight with each of the corresponding at least one criterion;

relationally storing the criterion and the assigned criterion weight in at least one knowledge-base;

relationally connecting, in the at least one knowledge-base, natural language data comprising an argument of an analysis of a first natural language expression with at least one of the at least one criterion based on a second data relationship connecting the at least one criterion with the argument;

relationally connecting, in the at least one knowledge-base, natural language data comprising at least one item of evidence with the argument and the at least one criterion based on a third data relationship connecting the at least one item of evidence, the argument, and the at least one criterion;

assigning an argument quality score for each argument connected with the respective criterion;

assigning an evidence quality score for each of at least one item of evidence connected with the respective argument and the criterion; and relationally storing in the at least one knowledge-base, the first natural language expression, the at least one criterion, the argument connected with the respective criterion, the at least one item of evidence connected with the argument and the respective criterion, the respective argument quality score, and the respective evidence quality score.

23. The system of claim 22, wherein the at least one processor performs a method further comprising:

for at least a portion of the at least one criterion assigned to the first natural language expression:

selectively extracting at least one argument and at least one item of evidence relationally connected with the at least one argument from a first set of natural language data received from at least one entity, the extracting based on syntactic rules, semantic rules, and contextual clues;

determining the argument quality score based at least on at least one argument scoring metric applied to the argument;

determining the evidence quality score for each of the at least one item of evidence based at least on at least one evidence scoring metric applied to the at least one item of evidence;

selecting, for each of the at least one criterion in the portion, the argument and the at least one item of evidence based at least on the magnitude of at least one of the argument quality score, and the evidence quality score for the at least one item of evidence;

aggregating, for each of the at least one criterion in the portion, the respective selected argument and the respective at least one item of evidence, into a first portion of data representing an answer based at least on natural language processing merging rules;

relationally storing into the at least one knowledge-base, for each of the at least one criterion in the first portion, the selected argument, the respective at least one item of evidence, and the answer; and retrieving from the knowledge-base, in response to a request, the answer, the argument and the at least one item of evidence in an order determined by the magnitude of the respective argument quality score, the criterion weight assigned to the criterion connected with the argument, and the respective evidence quality score for the at least one item of evidence.

* * * * *